(12) United States Patent
Asghari et al.

(10) Patent No.: US 8,897,606 B2
(45) Date of Patent: Nov. 25, 2014

(54) RING RESONATOR WITH WAVELENGTH SELECTIVITY

(75) Inventors: Mehdi Asghari, Pasadena, CA (US); Dazeng Feng, El Monte, CA (US); Po Dong, Arcadia, CA (US); Roshanak Shafiiha, La Canada-Flintridge, CA (US); Shirong Liao, Mira Loma, CA (US); Ning-Ning Feng, Arcadia, CA (US)

(73) Assignee: Kotura, Inc., Monterey Park, CA (US)

( * ) Notice: Subject to any disclaimer, the term of this patent is extended or adjusted under 35 U.S.C. 154(b) by 157 days.

(21) Appl. No.: 12/928,076

(22) Filed: Dec. 1, 2010

(65) Prior Publication Data

US 2011/0142391 A1    Jun. 16, 2011

(51) Int. Cl.
*G02F 1/225* (2006.01)
*G02B 6/26* (2006.01)

(52) U.S. Cl.
CPC .......... *G02F 1/2257* (2013.01); *G02F 2203/15* (2013.01); *G02F 2201/122* (2013.01)
USPC .............................................. 385/2

(58) Field of Classification Search
USPC ....................................... 385/1–2
See application file for complete search history.

(56) References Cited

U.S. PATENT DOCUMENTS

| | | | |
|---|---|---|---|
| 6,570,893 B1 | 5/2003 | Libatique et al. | |
| 6,636,668 B1 | 10/2003 | Al-hemyari et al. | |
| 7,043,115 B2 * | 5/2006 | Frick | 385/27 |
| 7,327,911 B2 | 2/2008 | Piede et al. | |
| 7,616,850 B1 * | 11/2009 | Watts et al. | 385/32 |
| 8,009,937 B2 * | 8/2011 | Mathai et al. | 385/2 |
| 8,027,587 B1 * | 9/2011 | Watts | 398/79 |
| 2004/0004978 A1 | 1/2004 | Margalit | |
| 2007/0230856 A1 * | 10/2007 | Yamazaki | 385/5 |
| 2009/0067773 A1 | 3/2009 | Krug et al. | |
| 2009/0103863 A1 | 4/2009 | Lee et al. | |
| 2009/0122817 A1 * | 5/2009 | Sato et al. | 372/20 |
| 2009/0161113 A1 | 6/2009 | Chen et al. | |
| 2009/0238515 A1 * | 9/2009 | Fattal et al. | 385/30 |
| 2009/0290835 A1 * | 11/2009 | Popovic | 385/32 |
| 2010/0209038 A1 * | 8/2010 | Popovic et al. | 385/1 |

* cited by examiner

*Primary Examiner* — Eric Wong
(74) *Attorney, Agent, or Firm* — Gavrilovich, Dodd & Lindsey, LLP

(57) ABSTRACT

The ring resonator includes waveguides configured to guide light signals. The waveguides include an input waveguide and one or more loop waveguides. One of the loop waveguides is a primary loop waveguide that is optically coupled with the input waveguide at a wavelength of light. A tuner is configured to tune the wavelength at which the light is optically coupled from the input waveguide into the primary loop waveguide. One or more light detectors are each configured to provide an output indicating an intensity of light guided in one of the one or more loop waveguides. Electronics are configured to tune the tuner in response to the output from the light detector.

17 Claims, 13 Drawing Sheets

US 8,897,606 B2

RING RESONATOR WITH WAVELENGTH SELECTIVITY

GOVERNMENT SUPPORT

This invention was made with Government support under Agreement No. HR0011-08-9-0001 awarded by DARPA. The Government has certain rights in this invention.

RELATED APPLICATIONS

This application claims the benefit of U.S. Patent Application Ser. No. 61/284,239, filed on Dec. 15, 2009, entitled "Ring Resonator with Wavelength Selectivity," and incorporated herein in its entirety.

FIELD

The present invention relates to optical devices and more particularly to devices having a light detector.

BACKGROUND

Ring resonators typically have a loop waveguide optically coupled with a bus (input/output) waveguide. These resonators are configured to resonate at a particular wavelength. When light of the resonance wavelength passes the ring resonator in the bus waveguide, that light is coupled from the bus waveguide into the ring resonator. The resonance wavelength is typically the wavelength of a particular optical channel. As a result, when that optical channel is present in the bus waveguide, that optical channel is coupled into the loop waveguide. Accordingly, that optical channel can be demultiplexed from other optical channels in the bus waveguide.

The limitations in the fabrication process for these resonators often cause them to resonate at a wavelength other than the intended wavelength. As a result, the device often fail to couple the desired channel or couple that channel with less efficiency than is desired.

For the above reasons, there is a need for an improved ring resonator.

SUMMARY

An optical device includes waveguides configured to guide light signals. The waveguides include an input waveguide and one or more loop waveguides. One of the loop waveguides is a primary loop waveguide that is optically coupled with the input waveguide at a wavelength of light. A tuner is configured to tune the wavelength at which the light is optically coupled from the input waveguide into the primary loop waveguide. One or more light detectors are each configured to provide an output indicating an intensity of light guided in one of the one or more loop waveguides. Electronics are configured to tune the tuner in response to the output from the light detector. The one or more light detectors can be configured to provide an output indicating the intensity of light guided in the primary loop waveguide or in one of the loop waveguides other than the primary loop waveguide.

BRIEF DESCRIPTION OF THE FIGURES

FIG. 5A is a topview of the portion of the device.

FIG. 5B is a cross section of the optical device shown in FIG. 5A taken along the line labeled B.

FIG. 8A illustrate the modulation region and sensing region being positioned on different lengths of the loop waveguide without overlapping one another.

FIG. 8B illustrates the modulation region overlapping the sensing region.

DESCRIPTION

An optical device includes waveguides configured to guide light signals. The waveguides include an input waveguide and one or more loop waveguides. One of the loop waveguides is a primary loop waveguide that is optically coupled with the input waveguide at a wavelength of light. A tuner is configured to tune the wavelength at which the light is optically coupled from the input waveguide into the primary loop waveguide. One or more light detectors are each configured to provide an output indicating an intensity of light guided in one of the one or more loop waveguides. Electronics are configured to tune the tuner in response to the output from the light detector. For instance, the electronics can be configured to tune the tuner such that light of a particular wavelength is coupled into the primary loop waveguide. Accordingly, the electronics can tune the tuner such that a particular optical channel is coupled into the primary loop waveguide. Further, the electronics can tune the tuner such that that optical channel is efficiently coupled into the primary loop waveguide.

Figure 1A:
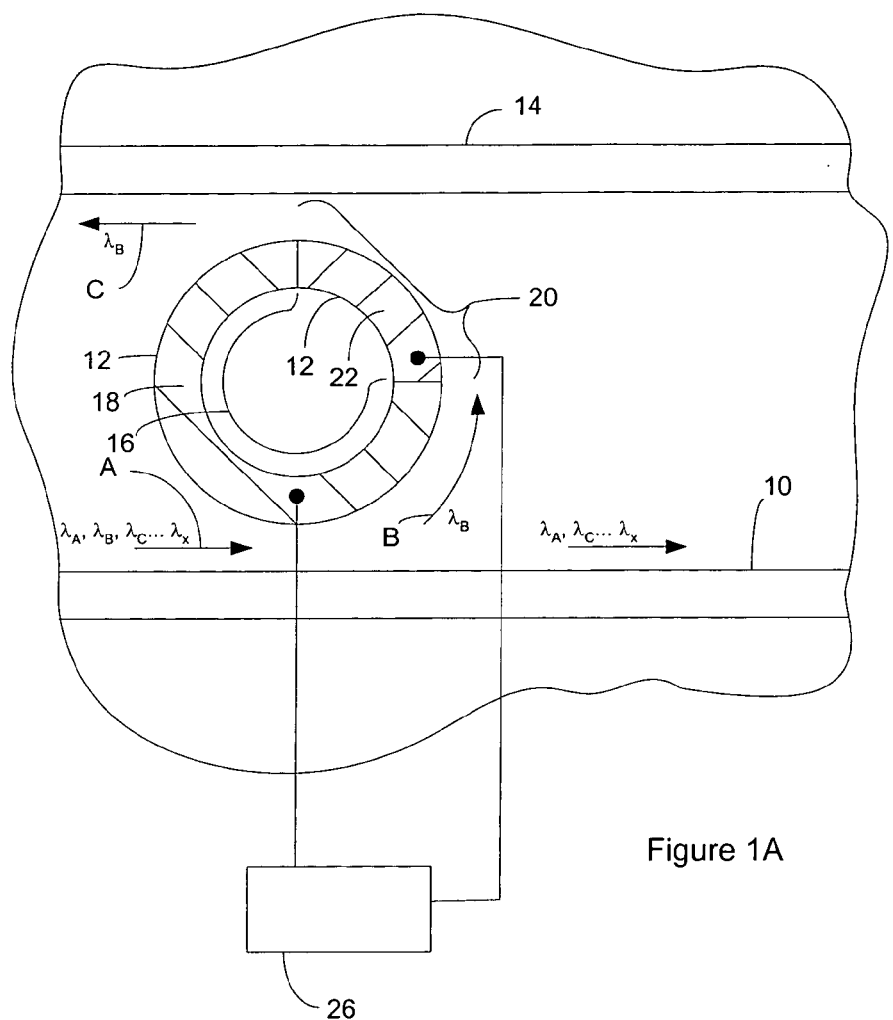
FIG. 1A illustrates a portion of an optical device that includes a ring resonator.

FIG. 1A illustrates a portion of an optical device that includes a ring resonator. The device includes an input waveguide 10, a loop waveguide 12, and an output waveguide 14. The input waveguide 10 and the output waveguide 14 are both optically coupled with the loop waveguide 12 at a particular wavelength or range of wavelengths. Additionally, the shortest distance between the input waveguide 10 and the loop waveguide 12 can be about the same as the shortest distance between the output waveguide 14 and the loop waveguide 12.

The portion of the device illustrated in FIG. 1A can be used to drop an optical channel from an input stream that includes multiple optical channels. For instance, the input waveguide 10 is shown carrying optical channels signals labeled $\lambda_A$, $\lambda_B$, $\lambda_C$, ... $\lambda_x$ in the direction of the arrow labeled A. The optical channels are each associated with a particular wavelength of light. If the input waveguide 10 and the output waveguide 14 are both optically coupled with the loop waveguide 12 at the wavelength associated with $\lambda_B$, the optical channel $\lambda_B$ is coupled into the loop waveguide 12 such that the optical channel $\lambda_B$ travels in the direction of the arrow labeled B. The optical channel $\lambda_B$ is also coupled from the loop waveguide 12 into the output waveguide 14 such that the optical channel $\lambda_B$ travels in the direction of the arrow labeled C. In contrast, the optical channels $\lambda_A$, $\lambda_C$, ... $\lambda_x$ are not coupled into the loop waveguide 12 and continue to travel along the input waveguide 10. Accordingly, the optical channel $\lambda_B$ is dropped from the stream of optical channels $\lambda_A$, $\lambda_B$, $\lambda_C$, ... $\lambda_x$ in the input waveguide 10.

Inaccuracies in the process of frabricating optical devices that include an input waveguide 10, output waveguide 14, and loop waveguide 12 can cause a wavelength other than the desired wavelength to be coupled to the loop waveguide 12. As a result, the loop waveguide can include a modulation region 16 (the location of the modulation region within the loop waveguide 12 is marked by the bracket labeled 16 in FIG. 1A). The modulation region 16 can include a modulator 18 in electrical communication with electronics 26. The electronics 26 can operate the modulator 18 so to tune the index of refraction of the modulation region 16 of the loop waveguide 12. Changing the index of refraction changes the speed at which light travels through the loop waveguide 12. Accordingly, tuning index of refraction changes the phase difference between the light in the input waveguide 10 and light in the loop waveguide 12. When the phase difference between the light in the loop waveguide 12 and the light in the input waveguide 10 is $n*2*\pi$ (n is an integer), there is constructive interference between the light in the loop waveguide 12 and the light in the input waveguide 10 and the light at the wavelength having the $n*2*\pi$ phase is coupled into the loop waveguide 12. As a result, the modulator 18 can be used to tune the wavelength of light that enters the loop waveguide 12. A variety of mechanisms can be employed to tune the index of refraction of the loop waveguide 12. For instance, the modulator 18 can employ carrier injection and/or a depletion region 62 to tune the index of refraction of the loop waveguide 12 and/or can employ temperature changes to tune the index of refraction of the loop waveguide 12.

The loop waveguide 12 also includes a sensing region 20. The sensing region 20 includes a light detector 22 in electrical communication with the electronics 26. The light detector 22 is configured to provide the electronics 26 an electrical signal indicating the presence of light in the loop waveguide 12. Additionally, the electronics 26 can employ the electrical signal to determine the intensity of the light in the loop waveguide 12. Although the light detector 22 can be sensitive over a range of light wavelengths, the light detector 22 is not necessarily limited to detection of the particular wavelength of light. For instance, in some instances, the light detector 22 can detect the presence of light having the wavelength associated with each of the optical channels $\lambda_A$, $\lambda_B$, $\lambda_C$, ... $\lambda_x$.

Figure 1B:
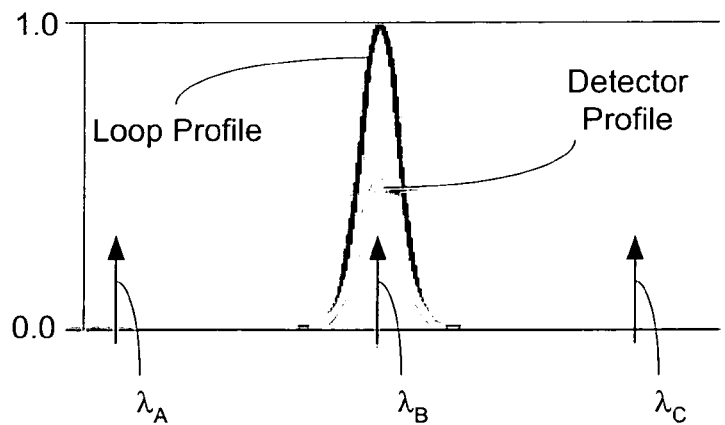
FIG. 1B illustrates an intensity versus wavelength diagram for the optical device of FIG. 1A.

FIG. 1B illustrates an intensity versus wavelength diagram for the optical device of FIG. 1A. The y-axis is the normalized intensity of light and the x-axis is the wavelength. The curve labeled "loop profile" illustrates the intensity versus wavelength profile of light that would be coupled into the loop waveguide 12 if light at each wavelength on the x-axis were present in the input waveguide 10 with a relative intensity of 1.0. The curve labeled "detector profile" illustrates the intensity versus wavelength profile of light that would be received by the light detector 22 if light at each of the wavelengths on the x-axis were present in the input waveguide 10 with a relative intensity of 1.0." The "detector profile" is shown with a lower intensity than the "loop profile" since the light detector 22 can be configured to receive only a portion of the light received in the loop waveguide 12. Further, the detector may provide output for a much larger range of wavelengths than what is illustrated by the "detector profile," however, since only certain wavelengths are coupled into the loop waveguide, the light detector can only provide output for these wavelengths. As a result, the "detector profile" can be limited to fewer wavelengths than would be possible for the light detector.

The location of the "loop profile" and the "detector profile" can be shifted relative to the wavelengths (i.e. left and right) by tuning the modulator 18. Since it is desirable for the light at the wavelength associated with channel $\lambda_B$ to be coupled into the loop waveguide 12, it is desirable to tune the modulator 18 such that peak of the loop profile is positioned at the wavelength associated with the channel $\lambda_B$. In order to achieve this tuning, the electronics 26 can tune the modulator 18 in response to output from the light detector 22.

During operation of the device, the input waveguide 10 can carry the optical channels $\lambda_A$, $\lambda_B$, $\lambda_C$, ... $\lambda_x$ that are each associated with a particular wavelength. The wavelengths associated with the optical channels $\lambda_A$, $\lambda_B$, $\lambda_C$ are labeled in FIG. 1B. Generally, the wavelength difference between these channels is a constant. Accordingly, the input waveguide 10 carries little or no light at wavelengths between the wavelengths associated with these channels. Accordingly, as is evident from FIG. 1B, the intensity of light coupled into the loop waveguide 12 is maximized when the peak of the loop profile is positioned at the wavelength associated with the channel $\lambda_B$. As a result, it is desirable to tune the modulator 18 such that peak of the loop profile is positioned at the wavelength associated with the channel $\lambda_B$. In order to achieve this tuning, in some instances, the electronics 26 tune the modulator 18 in response to output from the light detector 22. For instance, the electronics 26 can tune the modulator 18 so as to maximize the intensity of the light that the light detector 22 indicated as being present in the loop waveguide. Maximizing the intensity of the light in the loop waveguide 12 increases the efficiency with which the light signal is coupled into the loop waveguide 12.

The portion of the device illustrated in FIG. 1A and FIG. 1B can be operated as a demultiplexer. For instance, the electronics 26 can continuously tune the modulator 18 so as to maximize the intensity of the light in the loop waveguide 12, in this event when the optical channel $\lambda_B$ is carried on the input waveguide 10 along with other optical channels, the optical channel $\lambda_B$ will be demultiplexed from the other channels and output on the output waveguide 14 but the other optical channels will be output on the input waveguide 10.

The device can also be operated as a modulator 18. As is evident from the above discussion, the electronics 26 can also tune the modulator 18 so as to shift the "loop profile" such that the intensity of the light in the loop waveguide 12 is minimized and/or effectively has zero intensity. Accordingly, the electronics 26 can tune the modulator 18 to different states between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on both the input waveguide 10 and also on the output waveguide 14.

The device can be operated as both a demultiplexer and a modulator 18. For instance, the input waveguide 10 can carry the optical channel $\lambda_B$ along with other optical channels. The electronics 26 can also tune the modulator 18 so as to shift the "loop profile" such that the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on the output waveguide 14 by itself and the other optical channels being output on the input waveguide 10. Additionally, an encoded optical channel $\lambda_B$ will also be output on the input waveguide 10.

Figure 1C:
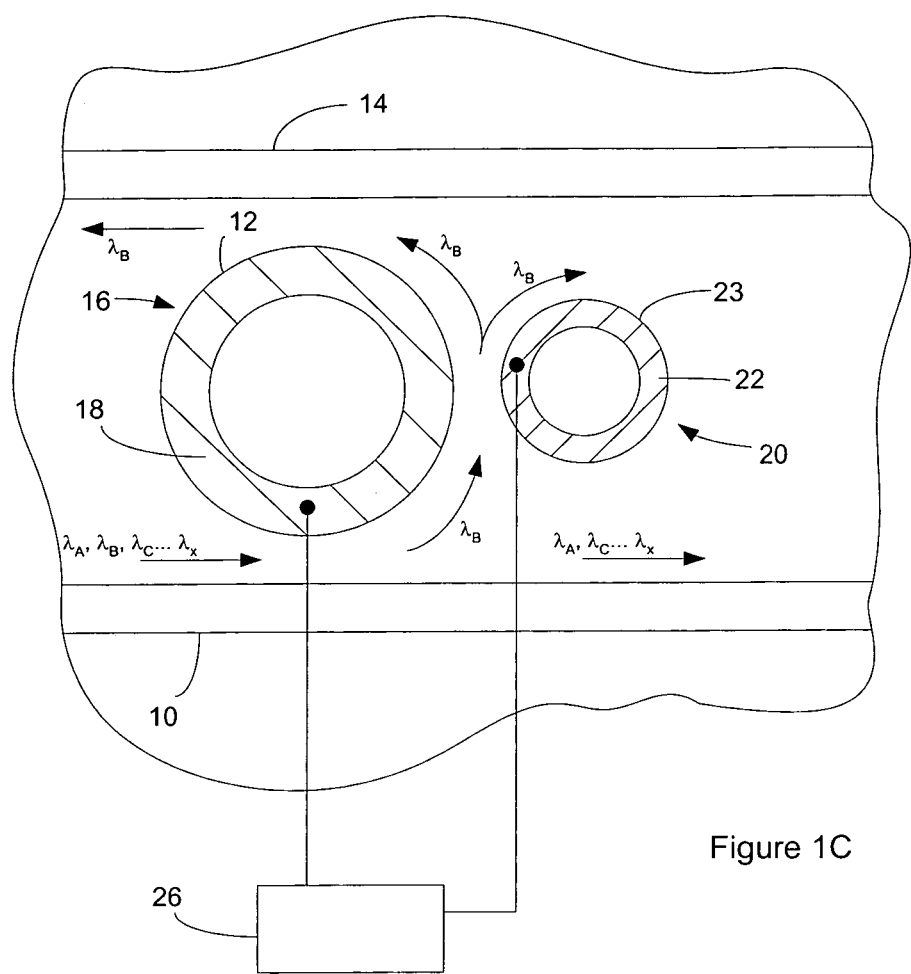
FIG. 1C illustrates another embodiment of the portion of the device shown in FIG. 1A.

Although FIG. 1A illustrates the light detector 22 integrated into the loop waveguide 12, the light detector can be remote from the loop waveguide. For instance, FIG. 1C illustrates the device of FIG. 1A with the light detector 22 replaced by a sensing loop waveguide 23 that includes the light detector 22. The sensing loop waveguide is optically coupled with the loop waveguide 12. Additionally, the sensing loop waveguide 23 is optically coupled with the loop waveguide 12 over a range of wavelength that include the same wavelengths at which the loop waveguide 12 is optically coupled to the input waveguide. Further, the sensing loop waveguide 23 is configured such that only a portion of the light that is coupled from the input waveguide 10 into the loop waveguide 12 is then coupled into the sensing loop waveguide 23. As a result, a portion of the light coupled into the loop waveguide 12 enters the sensing loop waveguide 23 and another portion enters the output waveguide. The portion that enters the sensing loop waveguide is detected by the light detector 22. Accordingly, the output of the light detector 22 indicates the presence of light in the loop waveguide 12. As a result, the electronics can operate the device of FIG. 1C as described for the device of FIG. 1A.

Figure 2A:
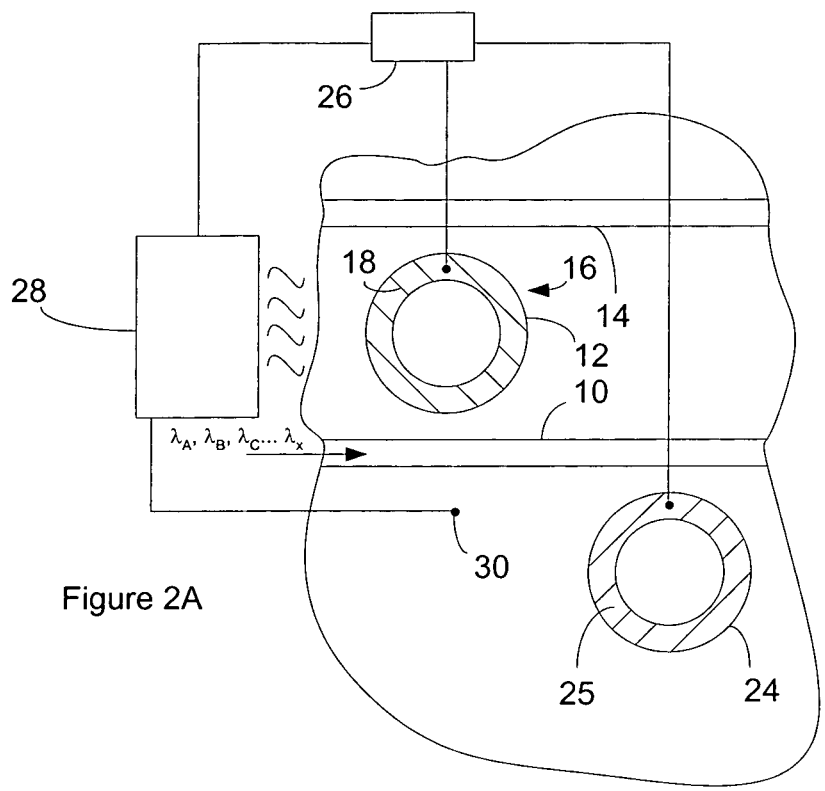
FIG. 2A illustrates a portion of an optical device that includes a ring resonator.

As is evident from FIG. 1B, when the modulator 18 is tuned such that each of the optical channels is outside of the "loop profile," the light detector 22 fails to provide output. In this event, tuning of the device can become difficult for some applications. As a result, it is desirable to increase the range of wavelengths for which the light detector provides output. The range of wavelengths over which the light detector provides an output can be increased by placing the light detector on a secondary loop waveguide 24 as illustrated in FIG. 2A. The device includes a secondary light detector 25 included in a sensing region of a secondary loop waveguide 24. The secondary loop waveguide 24 is positioned such that the light that is not coupled from the input waveguide 10 into the loop waveguide 12 is exposed to the secondary loop waveguide and may be coupled into the secondary loop waveguide 24. Further, the secondary loop waveguide 24 is optically coupled with the input waveguide 10 at the same wavelength at which the output waveguide 14 is optically coupled to the loop waveguide 12. For instance, the secondary loop waveguide 24 can have the same radius as the loop waveguide 12. As a result, the light that is coupled from the input waveguide 10 into the loop waveguide 12 and then into the output waveguide 14 is then coupled into the secondary loop waveguide 24.

The secondary loop waveguide 24 is not coupled to any other waveguide at the wavelength which the input waveguide 10 is optically coupled to the secondary loop waveguide 24. In particular, the secondary loop waveguide 24 is not coupled to any waveguide other than the input waveguide 10. As a result, dissipation of light in the secondary loop waveguide 24 results from optical loss in the secondary loop waveguide 24 but not from coupling into another waveguide. Accordingly, the secondary light detector 25 of FIG. 2A will provide an output over a larger range of wavelengths than is received by the loop waveguide 12.

Additional methods can optionally be employed to increase the range of wavelengths for which the secondary loop waveguide 24 provides output. For instance, the secondary loop waveguide 24 can be closer to the input waveguide 10 than the loop waveguide 12. In particular, the minimum distance between the secondary loop waveguide 24 and the input waveguide 10 can be less than the minimum distance between the loop waveguide 12 and the input waveguide 10. Decreasing the distance between the secondary loop waveguide 24 and the input waveguide 10 increases the amount of light coupled into the secondary loop waveguide 24. Since the additional light can have a broader range of wavelengths than the light coupled into the loop waveguide, the reduced distance can increase the range of wavelengths for which the secondary light detector 25 provides output.

Electronics 26 are in electrical communication with the secondary light detector 25, a modulator 18 on the loop waveguide 12, and a wavelength tuner 28. The electronics 26 can operate the wavelength tuner 28 so as to concurrently tune the wavelength coupled into both the loop waveguide 12 and the secondary loop waveguide 24. For instance, the wavelength tuner 28 can be a temperature controller configured to control the temperature of the device and the electronics 26 can operate the temperature controller. The temperature controller can be configured to control the temperature of the entire device or can be localized so it controls the temperature of a portion of the device limited to the portion of the device having the loop waveguide 12 and the secondary loop waveguide 24. Changing the temperature of the portion of the device having the loop waveguide 12 and the secondary loop waveguide 24 changes the index of refraction of the waveguides in this portion of the device. As a result, this temperature change can be used to tune the wavelength of light coupled into both the loop waveguide 12 and the secondary loop waveguide 24. Since the temperature change to both the loop waveguide 12 and the secondary loop waveguide 24 is about the same, the changes to the wavelength coupled into the loop waveguide 12 and the secondary loop waveguide 24 is about the same. As a result, the temperature controller can be used to concurrently provide the same level of tuning to both the loop waveguide 12 and the secondary loop waveguide 24.

The electronics 26 can be configured to operate the wavelength tuner 28 at a variety of operating states and/or to hold the wavelength tuner 28 at an operating states. The wavelength coupled into a loop waveguide 12 remains substantially constant when the wavelength tuner 28 operates the wavelength tuner 28 at a constant operating state. When the wavelength tuner 28 includes or consists of a temperature controller, the electronics 26 can also optionally be in electrical communication with one or more temperature sensors 30. The electronics 26 can be configured to operate the temperature controller at an operating state by operating the temperature controller such that the temperature indicated by the one or more temperature sensors 30 remains substantially constant. Suitable temperature sensors 30 include, but are not limited to, thermistors, and thermocouples.

Figure 2B:
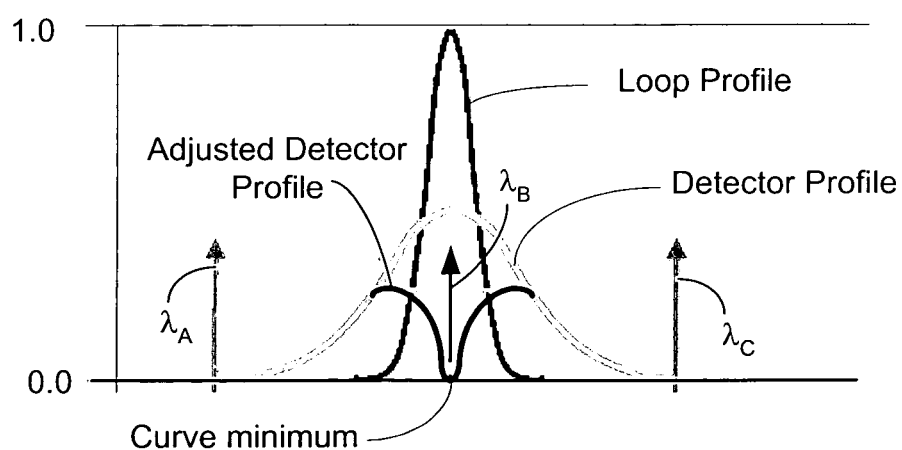
FIG. 2B illustrates an intensity versus wavelength diagram for the optical device of FIG. 2A.

FIG. 2B illustrates an intensity versus wavelength diagram for the optical device of FIG. 2A. The y-axis is the normalized intensity of light and the x-axis is the wavelength. The curve labeled "loop profile" illustrates the intensity versus wavelength profile of light that would be coupled into the loop waveguide 12 if light at each of the wavelengths on the x-axis were present in the input waveguide 10 with a relative intensity of 1.0. The curve labeled "detector profile" illustrates the intensity versus wavelength profile of light that would be received by the secondary light detector 25 if light at each of the wavelengths on the x-axis were present in the input waveguide 10 with a relative intensity of 1.0 but none of that light was coupled into the loop waveguide 12. For the reasons disclosed above, the secondary light detector 25 provides an output over a larger range of wavelengths than a secondary light detector 25 on the loop waveguide 12 would provide. As a result, the curve labeled "detector profile" extends over a larger range or wavelengths than the curve labeled "loop waveguide 12."

However, a portion of the light in the input waveguide 10 may be coupled into the loop waveguide 12 before that light is exposed to the second loop waveguide 12. As a result, the diagram also includes a curve labeled the "adjusted detector profile" that shows that that the secondary light detector 25 would indicate if light at each of the wavelengths on the x-axis were present in the input waveguide 10 with a relative intensity of 1.0 but a portion of that light is coupled into the loop waveguide 12 before that light is exposed to the secondary loop waveguide 24. As a result, the "adjusted detector profile" incorporates the effect of the loop profile on the output of the secondary light detector 25.

The location of the "adjusted detector profile" and the "detector profile" can be shifted relative to the wavelengths (i.e. left and right) by tuning the wavelength tuner 28. Since it is desirable for the light at the wavelength associated with channel $\lambda_B$ to be coupled into the loop waveguide 12, it is desirable to tune the modulator 18 such that peak of the loop profile is positioned at the wavelength associated with the channel $\lambda_B$. In order to achieve this tuning, the electronics 26 can tune the wavelength tuner 28 in response to output from the secondary light detector 25.

As is evident from FIG. 2B, the intensity of light coupled into the loop waveguide 12 is maximized when the peak of the loop profile is positioned at the wavelength associated with the channel $\lambda_B$. As a result, it is desirable to tune the wavelength tuner 28 such that peak of the loop profile is positioned at the wavelength associated with the channel $\lambda_B$. In order to achieve this tuning, the electronics 26 can tune the wavelength tuner 28 in response to output from the secondary light detector 25. As is evident from FIG. 2B, the peak of the loop profile is positioned at the wavelength associated with the channel $\lambda_B$ when the adjusted detector profile is at the point labeled "curve minimum." Accordingly, the electronics 26 can tune the wavelength tuner 28 such that the output of the secondary light detector 25 is at a minimum or some instances zero.

The electronics 26 can distinguish the point labeled "curve minimum" from other minimums because shifting the "adjusted detector profile" to both shorter and longer wavelengths will cause the secondary light detector 25 output to increase. Accordingly, once the electronics 26 identify that the output of the secondary light detector 25 is at a minimum, the electronics 26 can operate the wavelength tuner 28 so as to shift the "adjusted detector profile" to both shorter and longer wavelengths. If the output of the secondary light detector 25 increases in response to each shift, the wavelength tuner 28 was properly tuned before making these shifts and the electronics 26 can operate the wavelength tuner 28 at the state of operation that was being employed before the above shifts were made. If the output of the secondary light detector 25 does not increase in response to each shift, the wavelength tuner 28 can re-tune the wavelength tuner 28 until another minimum in the output of the secondary light detector 25 is found. Once the next minimum is found, the electronics 26 can again operate the wavelength tuner 28 so as to shift the "adjusted detector profile" to both shorter and longer wavelengths as described above in order to determine when the desired minimum has been found. The electronics 26 can repeat these operations until the desired minimum has been found.

The device can be operated as a demultiplexer. For instance, once the electronics 26 identify the desired state of operation for the wavelength tuner 28, the electronics 26 can continue to operate the wavelength tuner 28 at the desired state of operation. As a result, when the input waveguide 10 includes multiple optical channels, the optical channel $\lambda_B$ will be demultiplexed from the other channels and output on the output waveguide 14.

The device can be operated as a modulator 18. For instance, the electronics 26 can continue to operate the wavelength tuner 28 at the desired state of operation and can also tune the modulator 18 so as to shift the "loop profile" such that the intensity of the light in the loop waveguide 12 is minimized and/or effectively has zero intensity. The electronics 26 can use the output of the secondary light detector 25 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on both the input waveguide 10 and also on the output waveguide 14.

The device can be operated as both a demultiplexer and a modulator 18. For instance, once the electronics 26 identify the desired state of operation for the wavelength tuner 28, the electronics 26 can continue to operate the wavelength tuner 28 at the desired state of operation and multiple optical channels can be carried by the input waveguide 10. The electronics 26 can also tune the modulator 18 so as to shift the "loop profile" such that the intensity of the light in the loop waveguide 12 is minimized and/or effectively has zero intensity. The electronics 26 can use the output of the secondary light detector 25 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on the output waveguide 14 by itself and the other optical channels being output on the input waveguide 10. Additionally, an encoded optical channel $\lambda_B$ will also be output on the input waveguide 10.

Figure 3A:
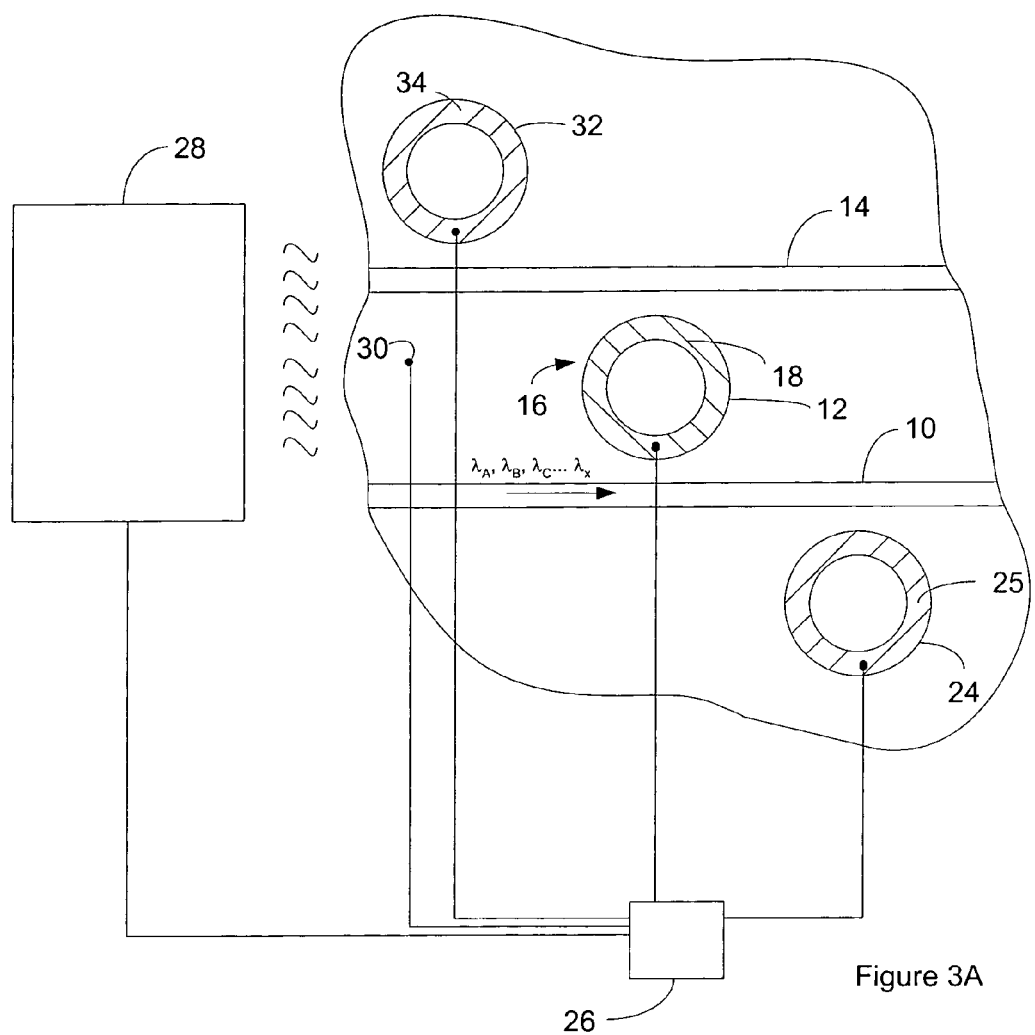
FIG. 3 illustrates a portion of an optical device that includes a ring resonator.
Figure 3B:
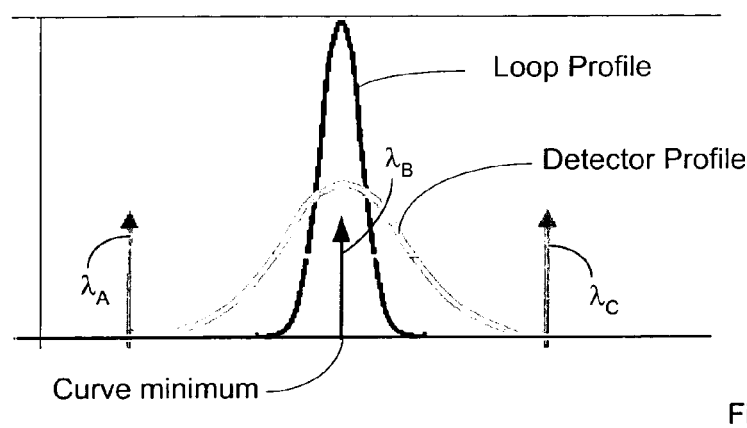

The device can include a tertiary loop waveguide 32 in order to further increase the range of wavelengths over which effective tuning can be achieved. As shown in FIG. 3, the tertiary loop waveguide 32 can include a tertiary light detector 34 configured to detect the presence of light in the tertiary loop waveguide 32 and the secondary loop waveguide 24 can include a secondary light detector 25 configured to detect the presence of light in the secondary loop waveguide 24.

The secondary loop waveguide 24 is positioned such that the light that is not coupled from the input waveguide 10 into the loop waveguide 12 is exposed to the secondary loop waveguide and may be coupled into the secondary loop waveguide 24. Further, the secondary loop waveguide 24 is optically coupled with the input waveguide 10 at the same wavelength at which the output waveguide 14 is optically coupled to the loop waveguide 12. For instance, the secondary loop waveguide 24 can have the same radius as the loop waveguide 12. As a result, the light that is coupled from the input waveguide 10 into the loop waveguide 12 and then into the output waveguide 14 is then coupled into the secondary loop waveguide 24.

The tertiary loop waveguide 32 is positioned such that the light that is coupled into the input waveguide 10 and then into the output waveguide 14 is exposed to the tertiary loop waveguide 32 and may be coupled into the tertiary loop waveguide 32. Further, the tertiary loop waveguide 32 is optically coupled with the output waveguide 14 at the same wavelength at which the output waveguide 14 is optically coupled to the loop waveguide 12 and also at the same wavelength at which the input waveguide 12 is optically coupled to the loop waveguide 12. For instance, the secondary loop waveguide 24 and the tertiary loop waveguide 32 can have the same radius as the loop waveguide 12. As a result, the light that is coupled from the input waveguide 10 into the loop waveguide 12 and then into the output waveguide 14 is then coupled into the tertiary loop waveguide 32. Further, if that same light were not coupled into the loop waveguide 12 it would be coupled into the secondary loop waveguide 24.

The secondary loop waveguide 24 is not coupled to any other waveguide at the wavelength which the input waveguide 10 is optically coupled to the secondary loop waveguide 24. In particular, the secondary loop waveguide 24 is not coupled to any waveguide other than the input waveguide 10. As a result, dissipation of light in the secondary loop waveguide 24 results from optical loss in the secondary loop waveguide 24 but not from coupling into another waveguide. Accordingly, the secondary light detector 25 of FIG. 2A will provide an output over a larger range of wavelengths than is received by the loop waveguide 12.

Additional methods can optionally be employed to increase the range of wavelengths for which the secondary loop waveguide 24 provides output. For instance, the secondary loop waveguide 24 can be closer to the input waveguide 10 than the loop waveguide 12. In particular, the minimum distance between the secondary loop waveguide 24 and the input waveguide 10 can be less than the minimum distance between the loop waveguide 12 and the input waveguide 10. Decreasing the distance between the secondary loop waveguide 24 and the input waveguide 10 increases the amount of light coupled into the secondary loop waveguide 24. Since the additional light can have a broader range of wavelengths than the light coupled into the loop waveguide, the reduced distance can increase the range of wavelengths for which the secondary light detector 25 provides output.

Electronics 26 are in electrical communication with the secondary light detector 25, the tertiary light detector 34, a modulator 18 on the loop waveguide 12, and a wavelength tuner 28. The electronics 26 can operate the wavelength tuner 28 so as to concurrently tune the wavelength coupled into both the loop waveguide 12, the secondary loop waveguide 24, and the tertiary loop waveguide 32. For instance, the wavelength tuner 28 can be a temperature controller configured to control the temperature of the device and the electronics 26 can operate the temperature controller. The temperature controller can be configured to control the temperature of the entire device or can be localized so it controls the temperature of a portion of the device limited to the portion of the device having the loop waveguide 12, the secondary loop waveguide 24, and the tertiary loop waveguide 32. Changing the temperature of the portion of the device having the loop waveguide 12, the secondary loop waveguide 24, and the tertiary loop waveguide 32 changes the index of refraction of the waveguides in this portion of the device. As a result, this temperature change can be used to tune the wavelength of light coupled into both the loop waveguide 12, the secondary loop waveguide 24, and the tertiary loop waveguide 32. Since the temperature change to the loop waveguide 12, the secondary loop waveguide 24, and the tertiary loop waveguide 32 is about the same, the changes to the wavelength coupled into the loop waveguide 12, the secondary loop waveguide 24, and the tertiary loop waveguide 32 is about the same. As a result, the temperature controller can be used to concurrently provide the same level of wavelength shift (tuning) to the loop waveguide 12, the secondary loop waveguide 24, and the tertiary loop waveguide 32.

The electronics 26 can be configured to operate the wavelength tuner 28 at a variety of operating states and/or to hold the wavelength tuner 28 at an operating state. The wavelength coupled into a loop waveguide 12 remains substantially constant when the wavelength tuner 28 operates the wavelength tuner 28 at a constant operating state. When the wavelength tuner 28 includes or consists of a temperature controller, the electronics 26 can also optionally be in electrical communication with one or more temperature sensors 30. The electronics 26 can be configured to operate the temperature controller at an operating state by operating the temperature controller such that the temperature indicated by the one or more temperature sensors 30 remains substantially constant. Suitable temperature sensors 30 include, but are not limited to, thermistors, and thermocouples.

When operating the device so $\lambda_b$ is coupled into the loop waveguide, it is desirable for the tertiary light detector 34 to indicate a high level of light intensity being coupled into the tertiary loop waveguide. At the same time, it is desirable for the secondary light detector 25 to indicate a low or zero level of light intensity being coupled into the secondary loop waveguide. As a result, the electronics can tune the wavelength tuner 28 such that the result of the intensity indicated by the tertiary light detector 34 minus the intensity indicated by the secondary light detector 25 is at a maximum. The operating state at which this difference is maximized can be the desired operating state. Alternately, or additionally, the electronics can tune the wavelength tuner 28 using one or more other criterion such as a ratio of the intensity indicated by the tertiary light detector 34: the intensity indicated by the secondary light detector 25.

The device can be operated as a demultiplexer. For instance, once the electronics 26 identify the desired state of operation for the wavelength tuner 28, the electronics 26 can continue to operate the wavelength tuner 28 at the desired state of operation. As a result, when the input waveguide 10 includes multiple optical channels, the optical channel $\lambda_B$ will be demultiplexed from the other channels and output on the output waveguide 14.

The device can be operated as a modulator 18. For instance, the electronics 26 can continue to operate the wavelength tuner 28 at the desired state of operation and can also tune the modulator 18 so as to shift the "loop profile" such that the intensity of the light in the loop waveguide 12 is minimized and/or effectively has zero intensity. The electronics 26 can use the output of the secondary light detector 25 and/or the tertiary light detector 34 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on both the input waveguide 10 and also on the output waveguide 14.

The device can be operated as both a demultiplexer and a modulator 18. For instance, once the electronics 26 identify the desired state of operation for the wavelength tuner 28, the electronics 26 can continue to operate the wavelength tuner 28 at the desired state of operation and multiple optical channels can be carried by the input waveguide 10. The electronics 26 can also tune the modulator 18 so as to shift the "loop profile" such that the intensity of the light in the loop waveguide 12 is minimized and/or effectively has zero intensity. The electronics 26 can use the output of the secondary light detector 25 and/or the tertiary light detector 34 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on the output waveguide 14 by itself and the other optical channels being output on the input waveguide 10. Additionally, an encoded optical channel $\lambda_B$ will also be output on the input waveguide 10.

Figure 4A:
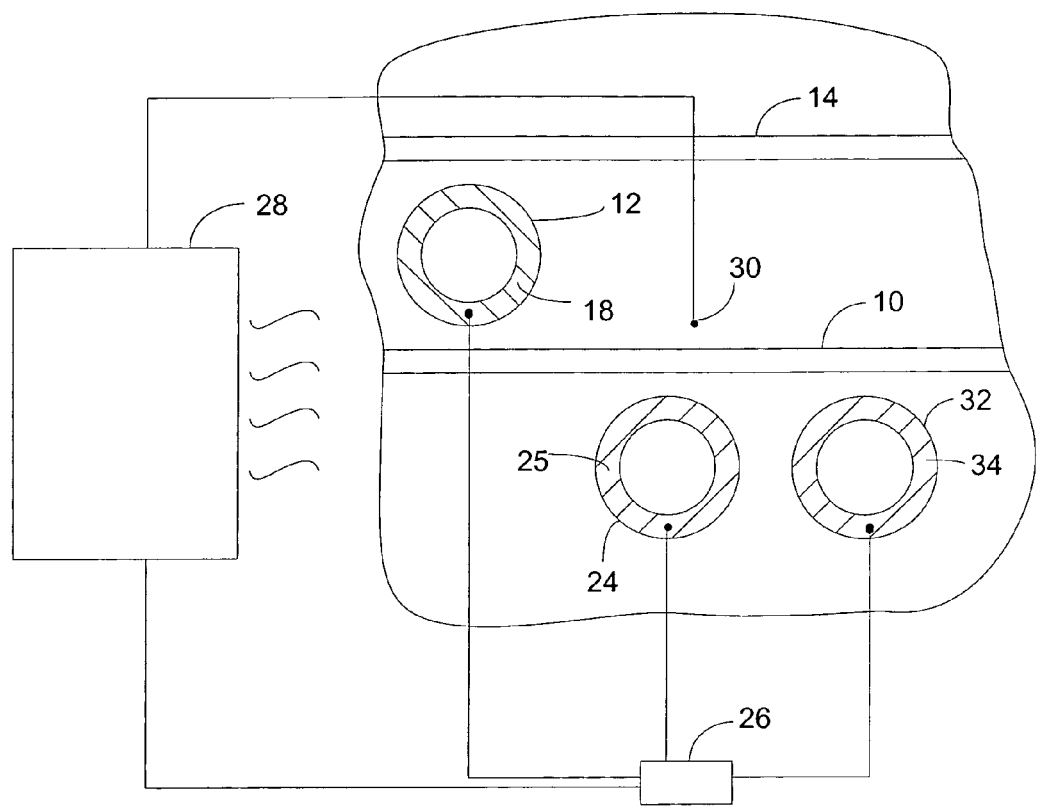
FIG. 4A illustrates a portion of an optical device that includes a ring resonator.

The tertiary loop waveguide and/or the secondary loop waveguide need not be configured to couple the same wavelength of light. FIG. 4A shows the secondary loop waveguide 24 and the tertiary loop waveguide 32 positioned such that the light that is not coupled into the loop waveguide 12 is exposed to the secondary loop waveguide 24 and/or the tertiary loop waveguide 32 such that the light can be coupled into the secondary loop waveguide 24 and/or the tertiary loop waveguide 32. For instance, when the secondary loop waveguide 24 is positioned along the input waveguide 10 between the loop waveguide 12 and the tertiary loop waveguide 32, the light that is not coupled into the loop waveguide 12 or into the secondary loop waveguide 24 is exposed to the tertiary loop waveguide 32 such that the light may be coupled into the tertiary loop waveguide 32. Additionally, the light that is not coupled into the loop waveguide 12 is exposed into the secondary loop waveguide 24 such that the light may be coupled into the secondary loop waveguide 24.

The loop waveguide 12 has a radius of about R, the secondary loop waveguide 24 has a radius of about R+ΔR or R−ΔR, and the tertiary loop waveguide 32 has a radius of about R+ΔR or R−ΔR. When the secondary loop waveguide 24 has a radius of about R+ΔR, the tertiary loop waveguide 32 has a radius of about R−ΔR. When the secondary loop waveguide 24 has a radius of about R−ΔR, the tertiary loop waveguide 32 has a radius of about R+ΔR. As a result, there is a difference between the wavelength of light coupled into the secondary loop waveguide 24 and coupled into the loop waveguide 12 and also a difference between the wavelength of light coupled into the tertiary loop waveguide 32 and coupled into the loop waveguide 12 and the magnitude of those differences is about the same. Accordingly, the magnitude of the difference between the wavelength of light detected by the secondary light detector 25 and the wavelength of light coupled into the loop waveguide 12 is about the same as the magnitude of the difference between the wavelength of light detected by the tertiary light detector 34 and the wavelength of light coupled into the loop waveguide 12.

The secondary loop waveguide 24 and/or the tertiary loop waveguide 32 can optionally be configured such that a broader range of wavelengths is coupled into these waveguides than are coupled into the loop waveguide 12. For instance, the secondary loop waveguide 24 is not coupled to any other waveguide at the wavelength which the input waveguide 10 is optically coupled to the secondary loop waveguide 24. Additionally or alternately, the tertiary loop waveguide 32 is not coupled to any other waveguide at the wavelength which the input waveguide 10 is optically coupled to the tertiary loop waveguide 32. Additional methods can optionally be employed to increase the range of wavelengths for which the secondary loop waveguide 24 and/tertiary loop waveguide 32 provides output. For instance, the secondary loop waveguide 24 and/or tertiary loop waveguide 32 can be closer to the input waveguide 10 than the loop waveguide 12 is to the input waveguide 10.

Electronics 26 are in electrical communication with the secondary light detector 25, the tertiary light detector 34, a modulator 18 on the loop waveguide 12, and a wavelength tuner 28. The electronics 26 can operate the wavelength tuner 28 so as to concurrently tune the wavelength coupled into the loop waveguide 12, the secondary loop waveguide 24, and the tertiary loop waveguide 32. For instance, the wavelength tuner 28 can be a temperature controller configured to control the temperature of the device. Alternately, the temperature controller can be localized so it controls the temperature of a portion of the device limited to the portion of the device having the loop waveguide 12 and the secondary loop waveguide 24. Changing the temperature of the portion of the device having the loop waveguide 12 and the secondary loop waveguide 24 changes the index of refraction of the waveguides in this portion of the device. As a result, this temperature change can be used to tune the wavelength of light coupled into the loop waveguide 12, the secondary loop waveguide 24, and the tertiary loop waveguide 32. Since the temperature change to the loop waveguide 12, the secondary loop waveguide 24, and the tertiary loop waveguide 32 is about the same, the changes to the wavelength coupled into the loop waveguide 12, the secondary loop waveguide 24, and the tertiary loop waveguide 32 is each about the same. As a result, the temperature controller can be used to concurrently provide the same level of tuning to the loop waveguide 12, the secondary loop waveguide 24, and the tertiary loop waveguide 32.

Figure 4B:
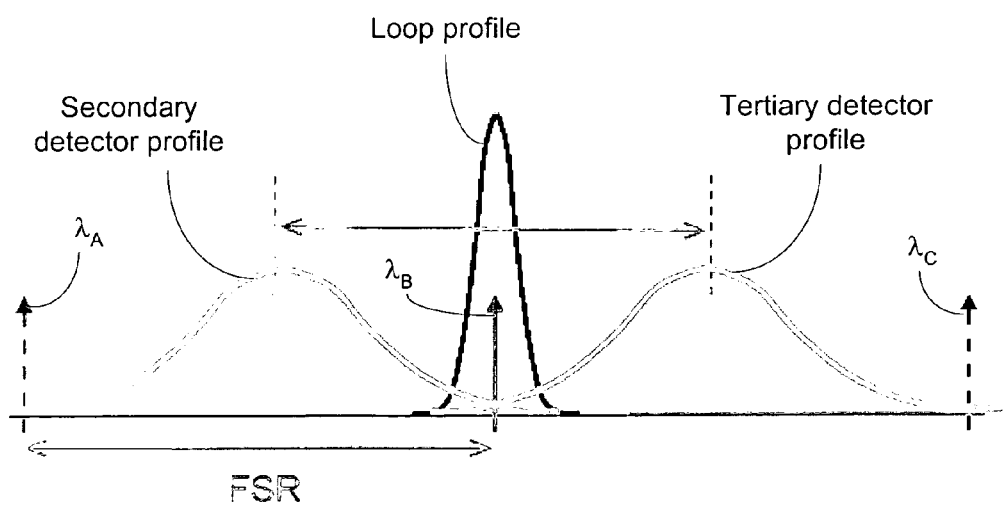
FIG. 4B illustrates an intensity versus wavelength diagram for the optical device of FIG. 1A.

FIG. 4B illustrates an intensity versus wavelength diagram for the optical device of FIG. 4A. The y-axis is the normalized intensity of light and the x-axis is the wavelength. The curve labeled "loop profile" illustrates the intensity versus wavelength profile of light that would be coupled into the loop waveguide 12 if light at each of the wavelengths on the x-axis were present in the input waveguide 10 with a relative intensity of 1.0. The curve labeled "secondary detector profile" illustrates the intensity versus wavelength profile of the light that would be received by the secondary light detector 25 if light at each of the wavelengths on the x-axis were present in the input waveguide 10 with a relative intensity of 1.0. The curve labeled "tertiary detector profile" illustrates the intensity versus wavelength profile of the light that would be received by the tertiary light detector 34 if light at each of the wavelengths on the x-axis were present in the input waveguide 10 with a relative intensity" of 1.0. For the reasons disclosed above, the secondary light detector 25 and/or the tertiary light detector 34 can be configured to provide an output over a larger range of wavelengths than is received in the loop waveguide 12. As a result, the curves labeled "secondary detector profile" and "tertiary detector profile" each extends over a larger range or wavelengths than the curve labeled "loop waveguide 12."

The location of the "loop profile," "secondary detector profile" and the "tertiary detector profile" can be shifted relative to the wavelengths (i.e. left and right) by tuning the wavelength tuner 28. Since it is desirable for the light at the wavelength associated with channel $\lambda_B$ to be coupled into the loop waveguide 12, it is desirable to tune the modulator 18 such that peak of the loop profile is positioned at the wavelength associated with the channel $\lambda_B$. In order to achieve this tuning, the electronics 26 can tune the wavelength tuner 28 in response to output from the secondary light detector 25.

As is evident from FIG. 4B, the intensity of light coupled into the loop waveguide 12 is maximized when the peak of the loop profile is positioned at the wavelength associated with the channel $\lambda_B$. As a result, it is desirable to tune the wavelength tuner 28 such that peak of the loop profile is positioned at the wavelength associated with the channel $\lambda_B$. In order to achieve this tuning, the electronics 26 can tune the wavelength tuner 28 in response to output from the secondary light detector 25. As is evident from FIG. 4B, the peak of the loop profile is positioned at the wavelength associated with the channel $\lambda_B$ when the "secondary detector profile" and the "tertiary detector profile" are both equal and non-zero. Accordingly, the electronics 26 can tune the wavelength tuner 28 such that the output of the secondary light detector 25 and output of the tertiary light detector 34 indicate the same non-zero intensity. The electronics 26 can do this tuning by tuning the wavelength tuner 28 so as to minimize the absolute value of the difference between the intensity indicated by the secondary light detector 25 and the tertiary light detector 34 and determining that both intensities have non-zero values.

The value of $\Delta R$ can be selected so that above tuning can be achieved. As the value of $\Delta R$ increases, the "secondary detector profile" and the "tertiary detector profile" can separate. As a result, the value of $\Delta R$ can be selected so as to provide a "secondary detector profile" and the "tertiary detector profile" that overlap.

The device can be operated as a demultiplexer. For instance, once the electronics 26 identify the desired state of operation for the wavelength tuner 28, the electronics 26 can continue to operate the wavelength tuner 28 at the desired state of operation. As a result, when the input waveguide 10 includes multiple optical channels, the optical channel $\lambda_B$ will be demultiplexed from the other channels and output on the output waveguide 14.

The device can be operated as a modulator 18. For instance, the electronics 26 can continue to operate the wavelength tuner 28 at the desired state of operation and can also tune the modulator 18 so as to shift the "loop profile" such that the intensity of the light in the loop waveguide 12 is minimized and/or effectively has zero intensity. The electronics 26 can use the output of the secondary light detector 25 and the tertiary light detector 34 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on both the input waveguide 10 and also on the output waveguide 14.

The device can be operated as both a demultiplexer and a modulator 18. For instance, once the electronics 26 identify the desired state of operation for the wavelength tuner 28, the electronics 26 can continue to operate the wavelength tuner 28 at the desired state of operation and multiple optical channels can be carried by the input waveguide 10. The electronics 26 can also tune the modulator 18 so as to shift the "loop profile" such that the intensity of the light in the loop waveguide 12 is minimized and/or effectively has zero intensity. The electronics 26 can use the output of the secondary light detector 25 and the tertiary light detector 34 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on the output waveguide 14 by itself and the other optical channels being output on the input waveguide 10. Additionally, an encoded optical channel $\lambda_B$ will also be output on the input waveguide 10.

Although the above discussion of the device disclosed in FIG. 4A and FIG. 4B is in context of the light signals in the input waveguide passing the loop waveguide 12 before the secondary loop waveguide 24 and the terriary loop waveguide 34, the device can be operated with these light signals traveling along the input waveguide 10 in the opposite direction. For instance, the light signals can travel along the input waveguide such that the pass the secondary loop waveguide 24 and the terriary loop waveguide 34 before the loop waveguide 12.

As is evident in FIG. 2A through FIG. 4B, the device can include multiple loop waveguides. As discussed above, the dimensional relationships between these loop waveguides are important to the operation of these devices. For instance, the secondary loop waveguide 24 of FIG. 2A can have the same radius as the loop waveguide 12. Further, when the loop waveguides 12 of FIG. 4A can have radii of R, R+$\Delta R$ and R−$\Delta R$. As these loop waveguides 12 move further apart on the device, these dimensional limitations can become more difficult to satisfy as a result of limitations in the fabrication processes. This distance preference applies to the loop waveguides 12 that are the furthest apart of the device. For instance, in a device constructed according to FIG. 4B, the distance preference applies to the loop waveguide 12 and the tertiary loop waveguide 32. Additionally, as fabrication techniques improve, these distance preferences can change or not apply.

The loop waveguide 12 of FIG. 2A through FIG. 4B can optionally include a light detector 22 in electrical communication with the electronics 26 as disclosed in the context of FIG. 1A through FIG. 1C and FIG. 7B (discussed below). For instance, the loop waveguide 12 of FIG. 2A through FIG. 4B can include both a sensing region 20 and a modulation region 16 as disclosed in the context of FIG. 1A through FIG. 1B. Alternately, the loop waveguide 12 of FIG. 2A through FIG. 4B can be used in conjunction with a light detector 22 arranged as disclosed in FIG. 1C or FIG. 7B (discussed below). These light detectors can serve as fine light detectors 22 for fine tuning of the device. For instance, once the electronics 26 identify the desired state of operation for the wavelength tuner 28, the electronics 26 can continue to operate the wavelength tuner 28 at the desired state of operation. The electronics 26 can then operate the modulator 18 in response to the output from the fine light detector 22. For instances, the electronics 26 can tune the modulator 18 so as to maximize the intensity of the light in the loop waveguide 12 where the intensity of the light in the loop waveguide 12 is indicated by the output of the fine light detector 22. In these instances, the waveguide tuner operates as a coarse tuner and the modulator 18 operates as a fine tuner. The maximum resulting from tuning of the modulator 18 is the fine tuning maximum. The electronics 26 can then operate the device as a modulator 18 and/or demultiplexer using the operation scheme discussed above in the context of FIG. 2A and FIG. 2B or FIG. 4A and FIG. 4B.

The resulting device can be operated as a demultiplexer. For instance, once the electronics 26 identify the desired state of operation for the wavelength tuner 28, the electronics 26 can continue to operate the wavelength tuner 28 at the desired state of operation and can continue to operate the modulator 18 such that the light coupled into the waveguide is at the fine tuning maximum. As a result, when the input waveguide 10 includes multiple optical channels, the optical channel $\lambda_B$ will be demultiplexed from the other channels and output on the output waveguide 14.

The device can be operated as a modulator 18. For instance, the electronics 26 can continue to operate the wavelength tuner 28 at the desired state of operation and can also tune the modulator 18 so as to shift the "loop profile" such that the intensity of the light in the loop waveguide 12 is minimized and/or effectively has zero intensity. The electronics 26 can use the output of the fine light detector 22 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is at the fine tuned maximum and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on both the input waveguide 10 and also on the output waveguide 14.

The device can be operated as both a demultiplexer and a modulator 18. For instance, once the electronics 26 identify the desired state of operation for the wavelength tuner 28, the electronics 26 can continue to operate the wavelength tuner 28 at the desired state of operation and multiple optical channels can be carried by the input waveguide 10. The electronics 26 can also tune the modulator 18 so as to shift the "loop profile" such that the intensity of the light in the loop waveguide 12 is minimized and/or effectively has zero intensity. The electronics 26 can use the output of the fine light detector 22 to determine when the intensity of the light in the loop waveguide 12 is minimized and/or effectively has zero intensity. Accordingly, the electronics 26 can tune the modulator 18 to different states at or between the state where the intensity of the light in the loop waveguide 12 is the fine tuning maximum and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on the output waveguide 14 by itself and the other optical channels being output on the input waveguide 10. Additionally, an encoded optical channel $\lambda_B$ will also be output on the input waveguide 10.

In the embodiments disclosed above, it is disclosed that the devices can each be operated as modulator. In the cases where the device is operated a modulator, the output waveguide 14 can be optional. For instance, in FIG. 1A through FIG. 2B and FIG. 4A through FIG. 4B, the output waveguide need not be used when the device is operated as a modulator. In these instances, the encoded output signal is the portion of the light signal that is not coupled into the loop waveguide 12. The portion of the light signal coupled into the loop waveguide 12 dissipates with time since there is not output waveguide into which the light can be coupled. Additionally, in the event that it is desirable to drop a channel without further processing of the dropped channel, the device can exclude the output waveguide 14 and be operated as a demultiplexer as disclosed above.

Additionally or alternately, the devices of FIG. 2A through FIG. 4B illustrate the loop waveguide 12 including a modulation region 16 that includes a modulator 18. However, when it is not desired to perform modulation and/or the fine tuning discussed above, the modulator is optional.

Although many descriptions of the operation of the device assume that multiple channels are present on the input waveguide, each of the above embodiments can optionally be operated with a single channel on the input waveguide.

Figure 5A:
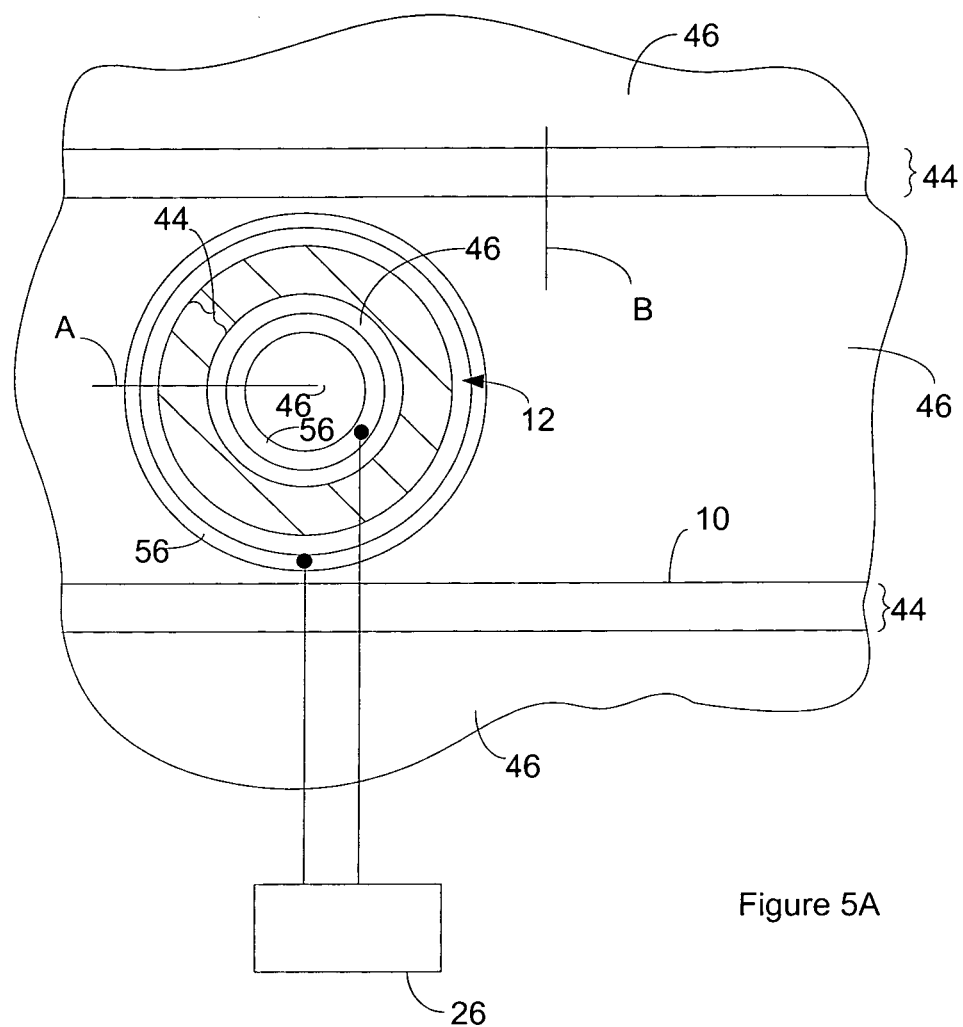
FIG. 5A through FIG. 5B illustrate a suitable construction for an optical device.
Figure 5B:
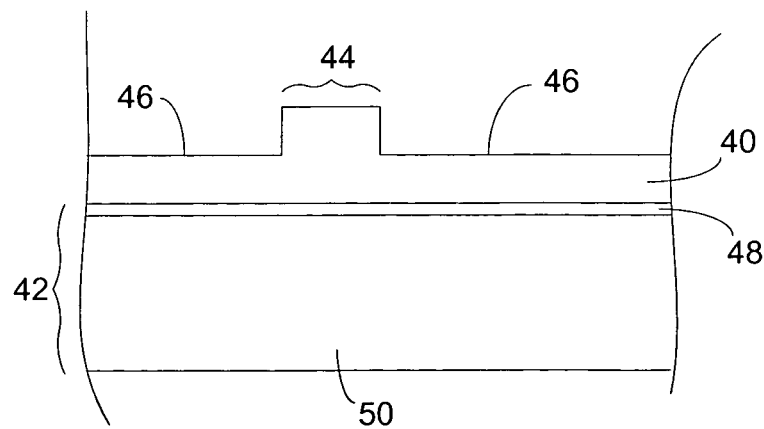

FIG. 5A through FIG. 5B illustrate a suitable construction for an optical device. FIG. 5A is a topview of the portion of the device. FIG. 5B is a cross section of the optical device shown in FIG. 5A taken along the line labeled B.

The device includes a light-transmitting medium 40 positioned on a base 42. A suitable light-transmitting medium 40 includes, but is not limited to, semiconductors such as silicon. The light-transmitting medium 40 includes ridges 44 extending from a slab 46 of the light-transmitting medium 40. The ridges 44 and the base 42 each define portions of the light signal-carrying regions of a loop waveguide 12, an input waveguide 10, and an output waveguide 14. The light signal-carrying regions are the regions of the waveguides where the fundamental mode and the higher order modes are guided. The materials that contact the ridges 44 can have an index of refraction less than the index of refraction of the light-transmitting medium 40. The reduced index of refraction reflects light signals from the ridge 44 back into the ridge 44. Additionally, the portion of the base 42 contacting the light-transmitting medium 40 under the ridge 44 can have an index of refraction less than the index of refraction of the light-transmitting medium 40. The reduced index of refraction reflects light signals from the light-transmitting medium 40 back into the light-transmitting medium 40. As a result, the fundamental mode and the higher order modes are constrained within the light signal-carrying region of the loop waveguide 12 and the bus waveguide.

The base 42 illustrated in FIG. 5B includes an insulator 48 positioned over a substrate 50. When the light-transmitting medium 40 is silicon, a suitable insulator 48 includes, but is not limited to, silica and a suitable substrate 50 includes a silicon substrate 50. A silicon-on-insulator 48 wafer is a suitable platform for an optical device having a silicon light-transmitting medium 40 positioned over a base 42 having a silica insulator 48 and a silicon substrate 50.

An upper medium is optionally positioned on the light-transmitting medium 40 and can serve as a cladding. Although an upper medium is not shown in FIG. 5A and FIG. 5B, an upper medium 52 is visible in each of FIG. 6A through FIG. 6D. The upper medium 52 can include one or more layers. Suitable materials for the layers include, but are not limited to, low K dielectrics such as silica, and/or silicon nitride. One or more of the layers can be selected to provide optical and/or electrical confinement. For instance, as noted above, the layer in contact with the light-transmitting medium 40 or ridges 44 can provide optical confinement by having an index of refraction that is less than the index of refraction of the light-transmitting medium 40.

Figure 6A:
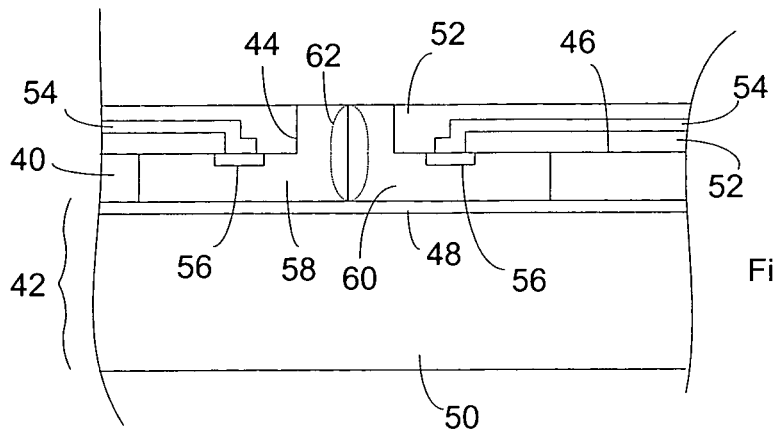
FIG. 6A is a cross section of a portion of a device having a modulator.

FIG. 6A is a cross section of a modulation region 16 included on the loop waveguide of FIG. 5A. For instance, FIG. 6A could represent a cross second of the loop waveguide shown in FIG. 5A taken along the line labeled A in FIG. 5A. Electrical connectors 54 each provides electrical communication between the electronics 26 (not shown) and a conducting region 56 of the light-transmitting medium. Each of the conducting regions 56 contacts a doped region of the light-transmitting medium. Suitable materials for the first electrical connectors 54 include, but are not limited to, tungsten, aluminum, copper and/or their alloys.

The doped regions 58, 60 include a first doped region 58 and a second doped region 60. When the first doped region 58 is an n-type region, the second dope region is a p-type region. When the first doped region 58 is a p-type region, the second dope region is an n-type region. In some instances, the first doped region 58 is preferably an n-type region and the second doped region 60 is preferably a p-type region. For instance, certain fabrication techniques may permit easier formation of a p-type region deeper in the light-transmitting medium that an n-type region.

The first doped region 58 and the second doped region 60 are positioned sufficiently close to one another that a depletion region 62 forms between the n-type region and the p-type region when a bias is not applied to the phase modulator 18. For instance, FIG. 6A illustrates the n-type region in contact with the p-type region. Contact between the n-type region and the p-type region may not be necessary although it can increase the efficiency of the modulator 18. The resulting interface is positioned in the ridge 44.

The depletion region 62 results from a migration of carriers between the n-type region and the p-type region until a potential forms that prevents additional migration. This migration results in a lack of carriers in the depletion region 62. For instance, the depletion region 62 has a carrier concentration of less than about $1 \times 10^{15}/cm^3$. The n-type region and a p-type region are positioned so the depletion region 62 is positioned in the light signal-carrying region of the waveguide. A suitable concentration of carriers in the p-type region includes values greater than $1 \times 10^{15}/cm^3$, $1 \times 10^{16}/cm^3$, $3.5 \times 10^{16}/cm^3$, or $5.0 \times 10^{17}/cm^3$. A suitable value for the concentration of carriers in the n-type region includes values greater than $1 \times 10^{15}/cm^3$, $2 \times 10^{16}$, $5 \times 10^{16}$, and $1 \times 10^{18}$ $cm^{-3}$.

The conducting regions 56 can each be a secondary doped region of the light-transmitting medium. Each of the secondary doped regions can contact the adjacent doped region and can include the same type of dopant as the adjacent doped region. The secondary doped region can have a higher dopant concentration than the doped region contacted by that secondary doped region. For instance, the dopant concentration in the secondary doped region can be more than 10 times the dopant concentration in the adjacent doped region or more than 1000 times the dopant concentration in the adjacent doped region. The elevated dopant concentration reduces the contact resistance of the phase modulator 18 and accordingly provides an increased modulation speed. Suitable concentrations for the dopant in the secondary doped region 44 include, but are not limited to, concentrations greater than $1 \times 10^{18}/cm^3$, $1 \times 10^{19}/cm^3$, $5 \times 10^{19}/cm^3$, $1 \times 10^{20}/cm^3$. Increasing the dopant concentration can increase the amount of optical loss. As a result, the secondary doped region is positioned remote from the light signal-carrying region in order to reduce optical loss resulting from the increased dopant concentration. For instance, the secondary doped region is positioned on a portion of the slab 46 spaced apart from the ridge 44. This location can reduce interaction between a light signal in the waveguide and the secondary doped region.

The electrical connectors 54 are connected to the electronics 26 (not shown). The electronics 26 can apply electrical energy to the electrical connectors 54 so as to form a reverse bias across the first doped region 58 and the second doped region 60. Changing the level of bias changes the size and/or shape of the depletion region 62. For instance, increasing the reverse bias can increase the size of the depletion region 62. The depletion region 62 has a different index of refraction than the light transmitting region located adjacent to the depletion region 62. For instance, when the light-transmitting medium 40 is silicon, the depletion region 62 has a higher index of refraction than that of the surrounding silicon. As a result, the depletion region 62 slows the light signal as the light signal travels through the depletion region 62. As a result, increasing the size of the depletion region 62 further slows the speed at which the light signal travels through the loop waveguide 12. Accordingly, the speed of the light signal through the loop waveguide 12 can be tuned by tuning the bias level. Additionally, because this phase tuning is based on tuning of the depletion region 62, tuning of the modulator 18 does not involve carrier re-combination. Carrier recombination is on the order of 1000 times slower than changes in the depletion region 62. Accordingly, the phase modulator 18 can be on the order of 1000 to 10000 times faster than phase modulators 18 that require carrier recombination.

A forward bias can be applied to the phase modulator 18. The forward bias will shrink the size of the depletion region 62. Accordingly, when the light-transmitting medium 40 is silicon, increasing the forward bias can accelerate the light signal. However, once the forward bias rises above a threshold, the forward bias can result in carrier injection based current flow. This current injection can also be used to provide the desired modulation. However, carrier injection requires recombination as the forward bias drops toward the threshold. Because tuning that requires recombination is slower than tuning of the depletion region 62, it may not be desirable to use the forward bias above levels where significant current flow occurs.

Figure 6B:
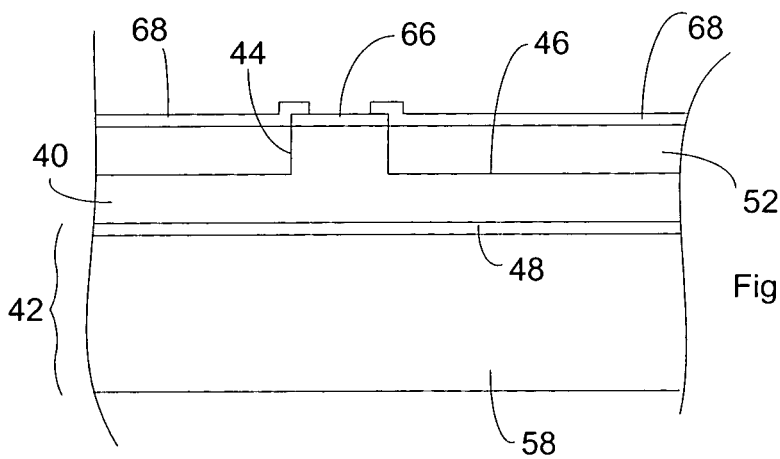
FIG. 6B is a cross section of a portion of a device having a light detector.

In some instances, the loop waveguide 12 includes a sensing region 20 that includes a light detector 22. FIG. 6B illustrates a cross section of suitable light detector 22. The light detector 22 includes, a light-absorbing medium 66 on top of the ridge 44 of light-transmitting medium. When the waveguide carries a light signal in the ridge 44, a portion of that light signal will enter the light-absorbing medium 66.

Because silicon does not absorb the light signals having the wavelengths that are used in communications applications, silicon is often not effective for use as the light-absorbing medium 66 in the light detectors for communications application. A light-absorbing medium 66 that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm. When the light-transmitting medium 40 is silicon and the light-absorbing medium 66 is germanium, the germanium can be grown on the seed portion of the silicon.

Electrical conductors 58 contact the light-absorbing medium 66 and are spaced apart from one another. The electrical conductors 58 provide electrical communication between the electronics 26 (not shown) and the light-absorbing medium 66. During operation of the light detector, the electronics 26 apply an electrical field across the light-absorbing material. When the light-absorbing material absorbs a light signal, an electrical current flows through the light-absorbing material. As a result, the level of electrical current through the light-absorbing material indicates the intensity of light signals being received by the light-absorbing material.

Figure 6C:
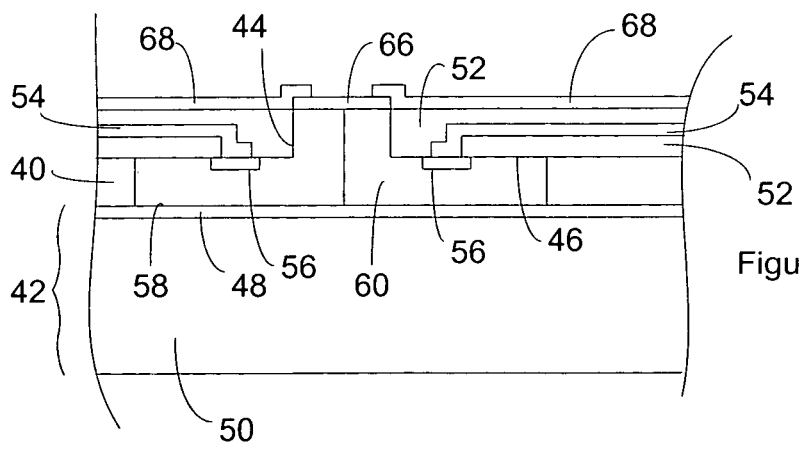
FIG. 6C is a cross section of a portion of a device having a modulator overlapping a light detector on a loop waveguide.

In some instance, the sensing region 20 of a loop waveguide 12 can overlap a modulation region 16 of the loop waveguide 12. For instance, FIG. 6C is a cross section of a device having sensing region 20 that overlaps a modulation region 16. The modulator 18 in the modulation region 16 is constructed according to FIG. 6A and the sensing region 20 is constructed according to FIG. 6B. The modulator 18 and the light detector 22 can be operated concurrently.

Figure 6D:
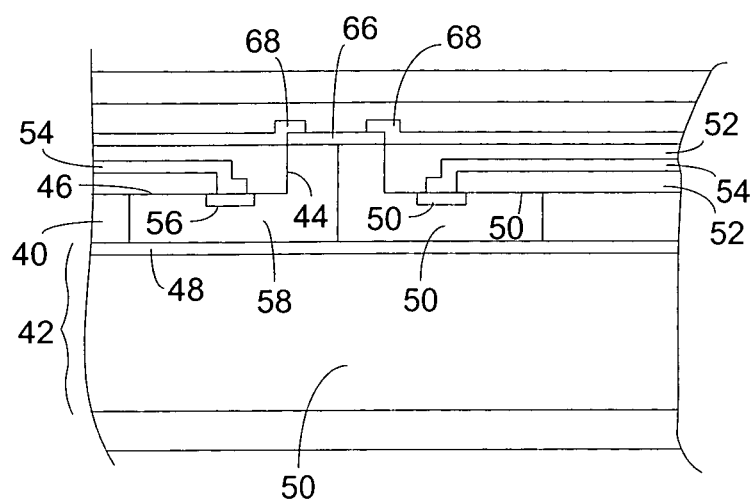
FIG. 6D shows the cross section of FIG. 6C with a temperature controller positioned on top of the device and another temperature controller positioned on a bottom of the device.

When the wavelength tuner 28 is a temperature controller, the temperature controller can be visible in the cross sections of FIG. 6A through FIG. 6C. For instance, FIG. 6D shows the cross section of FIG. 6C with a temperature controller positioned on top of the device and another temperature controller positioned on a bottom of the device. The device need not include both temperature controllers and can include only one. A suitable temperature controllers for use in this arrangement includes, but is not limited to, a resistive heater, a resistive heating element, a plate having conduits for carrying heated and/or cooled liquids.

Additional details about construction and/or operation of a modulator 18 constructed according to FIG. 6A through FIG. 6C can be found in U.S. patent application Ser. No. 11/146,898, filed on Jun. 7, 2005, entitled "High Speed Optical Phase Modulator 18," now U.S. Pat. No. 7,394,948, and incorporated herein in its entirety. Alternately, a ring resonator having a modulator 18 and temperature controller is disclosed in U.S. patent application Ser. No. 12/228,671, filed on Aug. 13, 2008, entitled "Electrooptic Silicon Modulator 18 with Enhanced Bandwidth," and incorporated herein in its entirety. The disclosed modulator 18 and temperature controller can be constructed as disclosed in U.S. patent application Ser. No. 12/228,671. The modulator can also be constructed according to the modulator disclosed in U.S. patent application Ser. No. 12/653,547, filed on Dec. 15, 2009, entitled "Optical Device Having Modulator Employing Horizontal Electrical Field," and incorporated herein in its entirety. The modulator can also be constructed according to the modulator disclosed in U.S. patent application Ser. No. 12/653,547, filed on Dec. 15, 2009, entitled "Optical Device Having Modulator Employing Horizontal Electrical Field," and incorporated herein in its entirety. Another suitable modulator construction for the modulator is disclosed in U.S. patent application Ser. No. 12/660,149, filed on Feb. 19, 2010, entitled "Reducing Optical Loss in Optical Modulator Using Depletion Region," and incorporated herein in its entirety.

When the modulator 18 is constructed according to U.S. patent application Ser. No. 12/228,671, the light-absorbing medium 66 and electrical conductors 58 of FIG. 6B can be added to the top of the loop waveguide 12 disclosed in U.S. patent application Ser. No. 12/228,671 in order to add the light detection functionality to the loop waveguide 12.

Figure 7A:
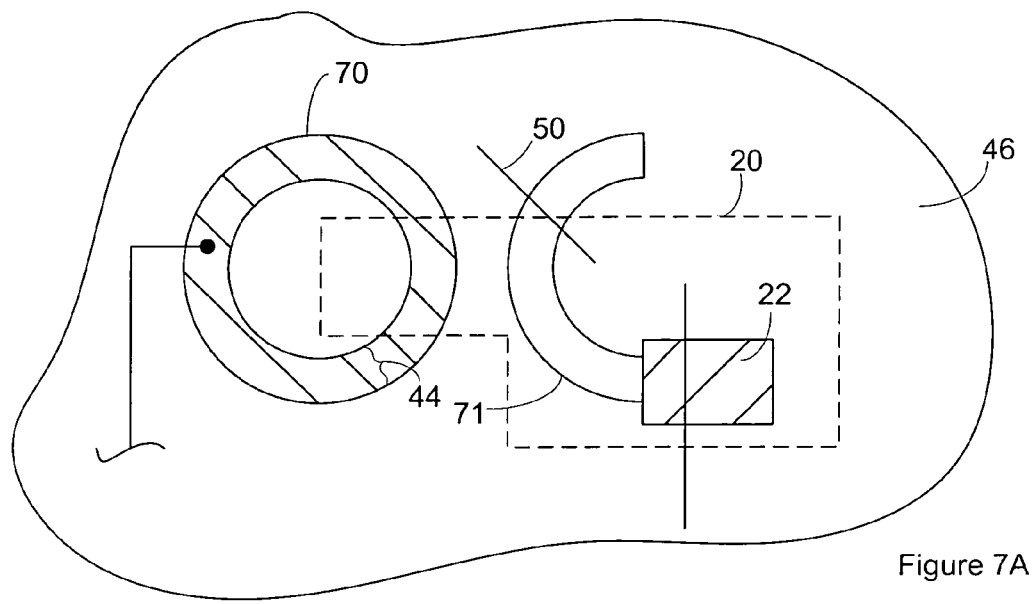
FIG. 7A through FIG. 7E illustrates different embodiments of the above devices.

Although FIG. 5A through FIG. 5D illustrate the light detector integrated into the loop waveguide, other light detector arrangements can be employed. For instance, the light detectors disclosed above need not be integrated into the loop waveguide. FIG. 7A provides an example of a light detector that is not integrated into a loop waveguide. FIG. 7A is a topview of the device. A tap waveguide 71 is optically coupled to the loop waveguide 70. The tap waveguide 71 is configured such that a portion of the light in the loop waveguide 70 is optically coupled into the tap waveguide 71. The tap waveguide 71 carries the tapped portion of the light to a light detector 22.

Figure 7B:
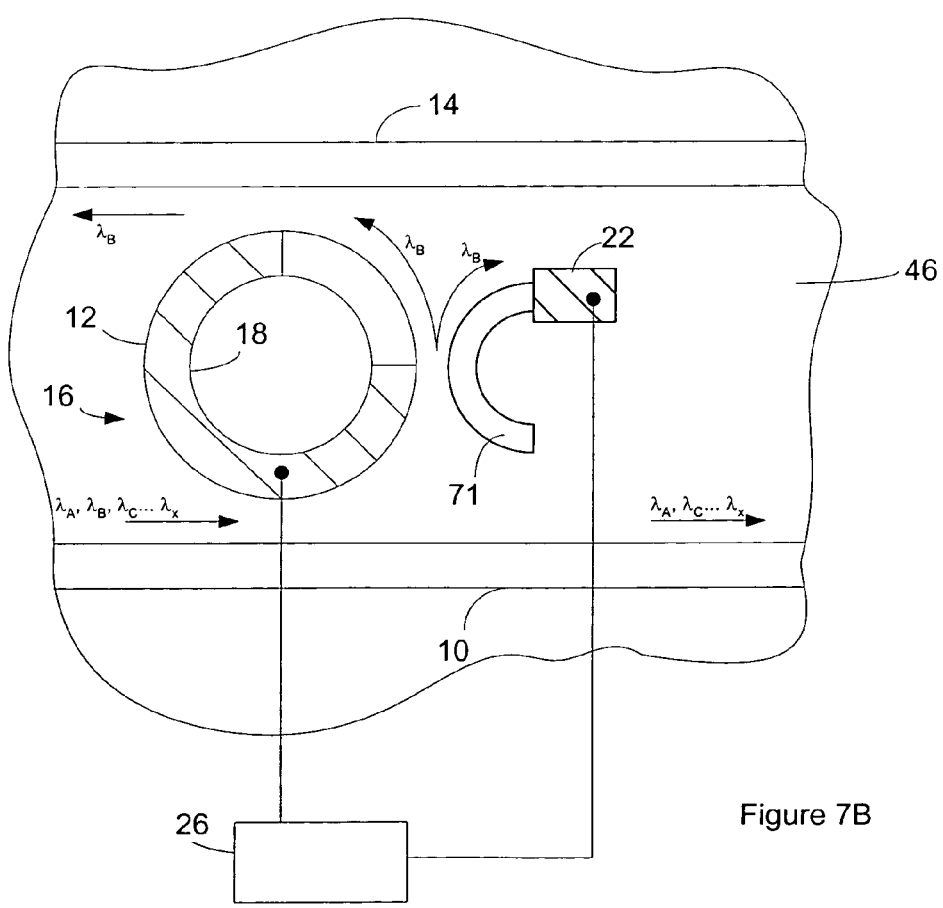

The light detector arrangement of FIG. 7A can be substituted for any of the sensing regions 20 disclosed above. For instance, the light detector arrangement of FIG. 7A can be substituted for any or all of the sensing regions 20 disclosed in FIG. 1A through FIG. 5B. As an example, FIG. 7B illustrates the device of FIG. 1A including the light detector 22 and tap waveguide 71 of FIG. 7A substituted for the sensing region of FIG. 1A. In this embodiment, the tap waveguide 71 is optically coupled with the loop waveguide 12 over a range of wavelength that include the same wavelengths at which the loop waveguide 12 is optically coupled to the input waveguide 10. As a result, a portion of the light coupled from the input waveguide 10 into the loop waveguide 12 is optically coupled into the tap waveguide 71.

Figure 7C:
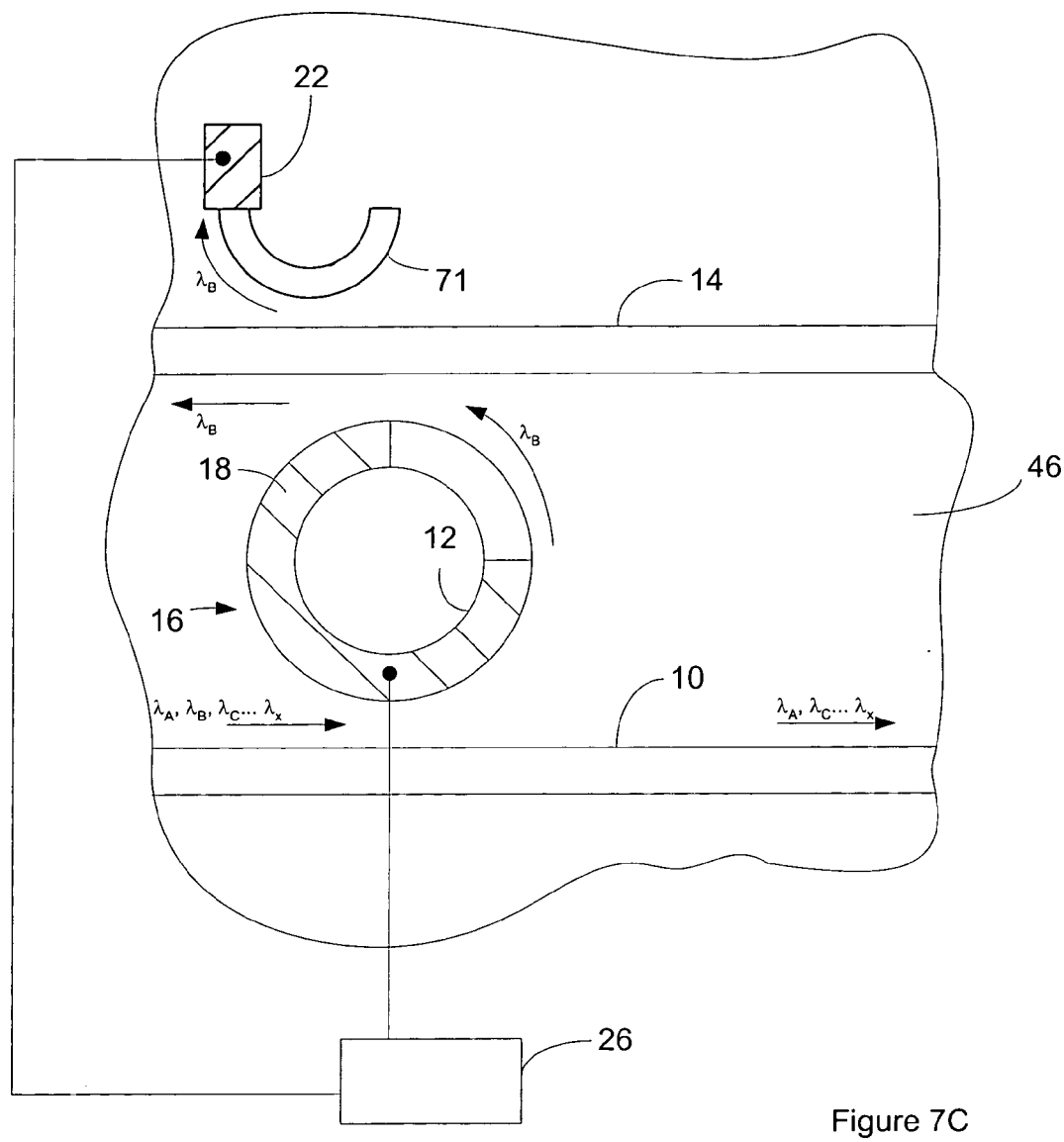

When the light detector is not integrated into a loop waveguide such as is shown in FIG. 7A and FIG. 7B, the light detector can be positioned in other locations while permitting the device to retain essentially the same method of operation disclosed above. For instance, FIG. 7C illustrates the device of FIG. 1A with the tap waveguide 71 and light detector 22 of FIG. 7A substituted for the sensing region 20 of FIG. 1A but optically coupled with the output waveguide 14. Accordingly, FIG. 7C illustrates the device of FIG. 7B with the tap waveguide 71 optically coupled with the output waveguide 14. The tap waveguide 71 is optically coupled with the loop waveguide 12 over a range of wavelengths that includes the same wavelength at which the loop waveguide 12 is optically coupled with the input waveguide 12. As a result, a portion of the light that is coupled into the loop waveguide 12 from the input waveguide 10 and then into the output waveguide 14 is coupled into the tap waveguide 71. As a result, the electronics can operate the device of FIG. 7D as described for the device of FIG. 1A.

Figure 7D:
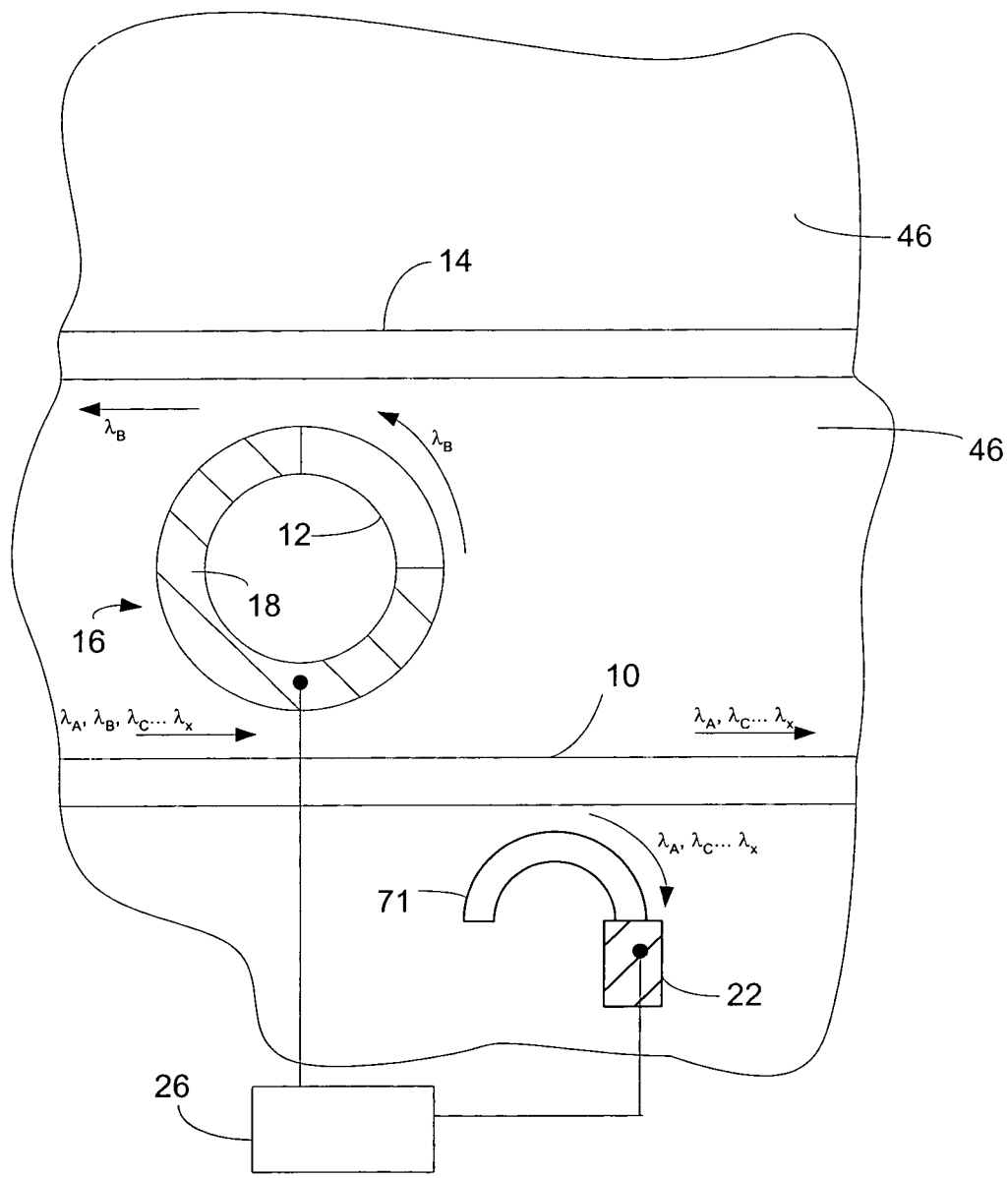

Although FIG. 7C shows the light detector 22 receiving light from the output waveguide 14, the light detector can receive light from the input waveguide 10. For instance, the tap waveguide 71 can be optically coupled with the input waveguide 10 as shown in FIG. 7D. For instance, FIG. 7D illustrates the device of FIG. 1A with the tap waveguide 71 and light detector 22 of FIG. 7A substituted for the sensing region 20 of FIG. 1A but optically coupled with the input waveguide 10. Accordingly, FIG. 7D illustrates the device of FIG. 7B with the tap waveguide 71 optically coupled with the input waveguide 10. The electronics can operate the device of FIG. 7D as described for the device of FIG. 1A but using the minimum of output from the light detector rather than the maximum. For instance, in some instances, the electronics 26 tune the modulator 18 so as to minimize the intensity of the light that the light detector 22 indicates as being present in the input waveguide. Minimizing the intensity of the light in the input waveguide 12 increases the efficiency with which the light signal is coupled into the loop waveguide 12. Additionally or alternately, the electronics 26 tune the modulator 18 so as to maximize the intensity of the light that the light detector 22 indicates as being present in the input waveguide. Maximizing the intensity of the light in the input waveguide 12 decreases the efficiency with which the light signal is coupled into the loop waveguide 12 and, in some instances, can result in effectively zero light being coupled into the loop waveguide 12.

The portion of the device illustrated in FIG. 7D can be operated as a demultiplexer. For instance, the electronics 26 can continuously tune the modulator 18 so as to maximize the intensity of the light in the loop waveguide 12, in this event when the optical channel $\lambda_B$ is carried on the input waveguide 10 along with other optical channels, the optical channel $\lambda_B$ will be demultiplexed from the other channels and output on the output waveguide 14 but the other optical channels will be output on the input waveguide 10.

The device can also be operated as a modulator 18. The electronics 26 can also tune the modulator 18 so as to shift the "loop profile" such that the intensity of the light in the loop waveguide 12 is minimized and/or effectively has zero intensity. Accordingly, the electronics 26 can tune the modulator 18 to different states between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on both the input waveguide 10 and also on the output waveguide 14.

The device can be operated as both a demultiplexer and a modulator 18. For instance, the input waveguide 10 can carry the optical channel $\lambda_B$ along with other optical channels. The electronics 26 can also tune the modulator 18 so as to shift the "loop profile" such that the intensity of the light in the loop waveguide 12 is minimized and/or effectively has zero intensity. Accordingly, the electronics 26 can tune the modulator 18 to different states at or between the state where the intensity of the light in the loop waveguide 12 is maximized and the state where the intensity of the light in the loop waveguide 12 is minimized. The electronics 26 can vary the modulator 18 between these different states such that the electronics 26 encode data onto the optical channel $\lambda_B$. Such a method of operating the device results in an encoded optical channel $\lambda_B$ being output on the output waveguide 14 by itself and the other optical channels being output on the input waveguide 10. Additionally, an encoded optical channel $\lambda_B$ will also be output on the input waveguide 10.

Figure 7E:
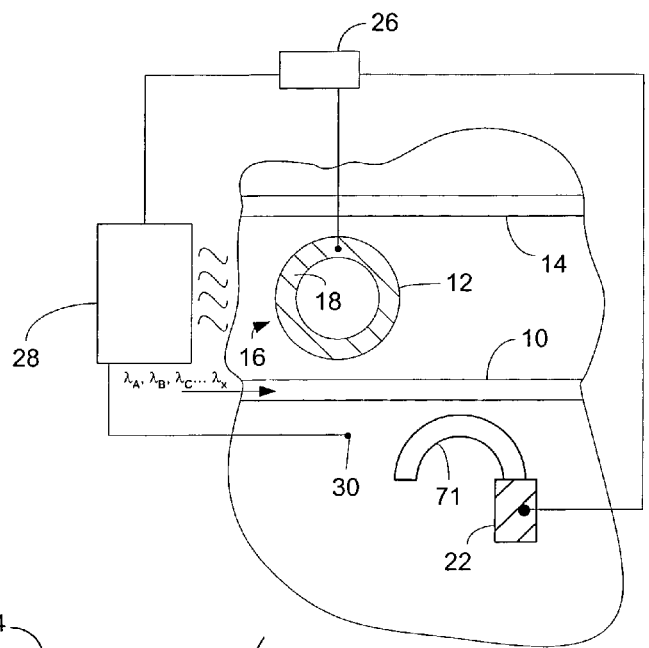

The light detector arrangement of FIG. 7A can be substituted for any of the combinations of secondary loop waveguides and secondary light detectors and/or substituted for any of the combinations of tertiary loop waveguides and tertiary light detectors disclosed above. For instance, FIG. 7E illustrates the device of FIG. 2A with the tap waveguide 71 and light detector 22 of FIG. 7A substituted for the secondary loop waveguide and secondary light detector.

Figure 7F:
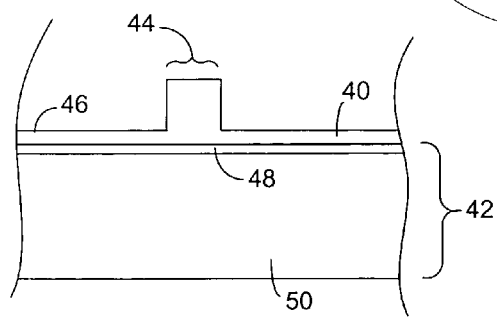
FIG. 7F is a cross section of the device shown in FIG. 7A taken along the line labeled B.
Figure 7G:
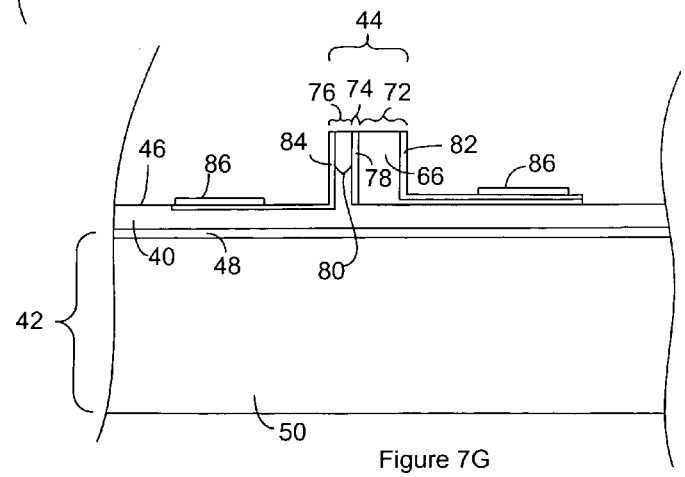
FIG. 7G is a cross section of the device shown in FIG. 7A taken along the line labeled C.

FIG. 7F and FIG. 7G illustrate a suitable construction for the tap waveguide 71 and light detector 22 of FIG. 7A. FIG. 7F is a cross section of the device shown in FIG. 7A taken along the line labeled B. FIG. 7G is a cross section of the device shown in FIG. 7A taken along the line labeled C. A suitable construction of the light detector is shown in FIG. 7G. The light detector includes a ridge 44 extending from slab 46 regions positioned on opposing sides of the ridge 44. The ridge 44 includes an absorption layer 72. For instance, FIG. 7G shows light-absorbing medium 66 that absorbs light signals serving as the absorption layer 72. Suitable light-absorbing media include media that upon being exposed to an electrical field, produce an electron and hole pair in response to receiving a photon. Examples of light-absorbing media that are suitable for detection of light signals in at the wavelengths commonly employed in communications applications includes, but are not limited to, germanium, silicon germanium, silicon germanium quantum well, GaAs, and InP. Germanium is suitable for detection of light signals having wavelengths in a range of 1300 nm to 1600 nm.

The absorption layer 72 is positioned to receive at least a portion of a light signal traveling along the tap waveguide 71. The absorption layer 72 can be positioned on a seed portion of the light-transmitting medium 40. In particular, the light-absorbing medium 66 of the light detector can be positioned on a seed portion of the light-transmitting medium 40. The seed portion of the light-transmitting medium 40 is positioned on the base 42. In particular, the seed portion of the light-transmitting medium 40 contacts the insulator 48. The seed portion of the light-transmitting medium 40 can be continuous with the light-transmitting medium 40 included in the waveguide or spaced apart from the waveguide. When the light signal enters the light detector, a portion of the light signal can enter the seed portion of the light-transmitting medium 40 and another portion of the light signal enters the light-absorbing medium 66. Accordingly, the light-absorbing medium 66 can receive only a portion of the light signal. In some instances, the light detector can be configured such that the light-absorbing medium 66 receives the entire light signal.

During the fabrication of the device, the seed portion of the light-transmitting medium 40 can be used to grow the light-absorbing medium 66. For instance, when the light- transmitting medium 40 is silicon and the light-absorbing medium 66 is germanium, the germanium can be grown on the silicon. As a result, the use of the light-transmitting medium 40 in both the waveguides and as a seed layer for growth of the light-absorbing medium 66 can simplify the process for fabricating the device.

The light detector also includes a charge layer 74 between a multiplication layer 76 and the absorption layer 72. At least a portion of the multiplication layer 76 is positioned such that the absorption layer 72 is not located between the portion of the multiplication layer 76 and the base 42. For instance, the portion of the multiplication layer 76 can contact the base 42. In some instances, the multiplication layer 76 is positioned such that none of the absorption layer 72 is between the base 42 and the multiplication layer 76. As a result, the multiplication layer 76 and the absorption layer 72 can be positioned adjacent to one another on the base 42. Further, the multiplication layer 76 and the absorption layer 72 can be positioned adjacent to one another such that a line that is parallel to the top and/or bottom of the base 42 extends through both the multiplication layer 76 and the absorption layer 72.

Although the multiplication layer 76 is shown as a single layer of material, the multiplication layer 76 can include multiple layers of material. Suitable materials for the multiplication layer 76 include, but are not limited to, materials that upon being exposed to an electrical field and receiving an electron can excite additional electronics 26. Examples include, but are not limited to, semiconductor materials including crystalline semiconductors such as silicon. As a result, in some instances, the light-transmitting medium 40 and the multiplication layer 76 can be the same material. In FIG. 7G, the light-transmitting medium 40 and the multiplication layer 76 are shown as the same material.

The multiplication layer 76 can include a doped region 78 that serves as the charge layer 74. The multiplication layer 76 can also include an undoped region 80 positioned such that the doped region 78 of the multiplication layer 76 is between the undoped region 80 of the multiplication layer 76 and the absorption layer 72. The doped region 78 can be an N-type doped region or a P-type doped region. In one example, the multiplication layer 76 is a layer of silicon that includes a region doped with a p-type dopant and the doped region 78 is in contact with the absorption layer 72.

The light-absorbing medium 66 or the absorption layer 72 can include a first doped region 82 that serves as a field source for the electrical field to be formed in the ridge 44. For instance, FIG. 7G illustrates the light-absorbing medium 66 including a first doped region 82 that serves as a field source for the electrical field to be formed in the ridge 44. The first doped region 82 can be continuous and unbroken and can be included both the ridge 44 and in the slab 46 region as is evident from FIG. 7G. In particular, the first doped region 82 can be included both in a lateral side of the ridge 44 and in the slab 46 region. The light-absorbing medium 66 or the absorption layer 72 can also include an undoped region 80 between the multiplication layer 76 and the second doped region 84.

As is evident in FIG. 7G, the portion of the slab 46 region that includes the first doped region 82 can also include or consist of the light-absorbing medium 66. As a result, the first doped region 82 can formed in a single continuous medium. As an example the first doped region 82 can be formed in germanium that is included both in the ridge 44 and in the slab 46 region. As is evident from FIG. 7G, the first doped region 82 can extend up to the top side of the light-absorbing medium 66. The first doped regions 82 can be an N-type doped regions or a P-type doped region.

The multiplication layer 76 can include a second doped region 84 that serves as a field source for the electrical field to be formed in the ridge 44. The second doped region 84 can be continuous and unbroken and can be included both the ridge 44 and in the slab 46 region as is evident from FIG. 7G. In particular, the second doped region 84 can be included both in a lateral side of the ridge 44 and in the slab 46 region. As is evident in FIG. 7G, the portion of the slab 46 region that includes the second doped region 84 can also include or consist of the same material as the multiplication layer 76. As a result, the second doped region 84 can formed in a single continuous medium. As an example the second doped region 84 can be formed in silicon that is included both in the ridge 44 and in the slab 46 region. As is evident from FIG. 7G, the second doped region 84 can extend up to the top side of the light-absorbing medium 66. The second doped regions 84 can be an N-type doped regions or a P-type doped region.

An N-type doped region can include an N-type dopant. A P-type doped region can include a P-type dopant. Suitable dopants for N-type regions include, but are not limited to, phosphorus and/or arsenic. Suitable dopants for P-type regions include, but are not limited to, boron. The first doped region 82 and the second doped region 84 can be doped so as to be electrically conducting. A suitable concentration for the P-type dopant in a P-type doped region that serves as the first doped region 82 or the second doped region 84 includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$. A suitable concentration for the N-type dopant in an N-type doped region that serves as the first doped region 82 or the second doped region 84 includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$.

As noted above, a region of the multiplication layer 76 can be an N-type doped region or a P-type doped region that serves as the charge layer 74. Suitable dopants for N-type regions include, but are not limited to, phosphorus and/or arsenic. Suitable dopants for P-type regions include, but are not limited to, boron. Since the doped region serves as the charge region, that doped region can have a lower concentration of dopant than the first doped region 82 and/or the second doped region 84.

In one example, the multiplication layer 76 includes or consists of silicon, the light-absorbing material includes or consists of silicon, the first doped region 82 is a p-type region, the second doped region 84 is an n-type region, and the second doped region 84 that serves as the charge region is a p-type region with a dopant concentration of about $1 \times 10^{17}$ cm$^{-3}$.

The first doped region 82 and the second doped region 84 are each in contact with an electrical conductor 86 such as a metal. Accordingly, the first doped region 82 provides electrical communication between one of the electrical conductors 86 and the light-absorbing medium 66. In particular, the first doped region 82 provides electrical communication between an electrical conductor 86 and the light-absorbing medium 66 included in a lateral side of the ridge 44. The second doped region 84 provides electrical communication between one of the electrical conductors 86 and the multiplication layer 76. In particular, the second doped region 84 provides electrical communication between one of the electrical conductors 86 and the portion of the multiplication layer 76 at the lateral side of the ridge 44.

During operation of the light detector, the electronics 26 apply a reverse bias between the first doped region 82 and the second doped region 84. When the first doped region 82 is a p-type region, the second doped region 84 is an n-type region, and the second doped region 84 that serves as the charge region is a p-type region, a positive charge develops at the charge layer 74. As a result, there is an increased electrical field at the charge layer 74. When a photon is absorbed in the undoped region 80 of the absorption layer 72, a hole and electron pair are generated. The electron is pulled toward the positive charge at the charge layer 74. The increased electrical field at the charge later causes excites the electron and causes the electron to accelerate. The electron can accelerate to the extent that interaction of the electron with the lattice structure of the multiplication layer 76 excites additional hole and electron pairs. In turn, these electrons may excite further hole and electron pairs. In this way, a single photon results in the creation of multiple electrons. These electrons provide electrical current through the light detector. The current level can be detected and/or measured by the electronics 26 in order to determine the presence and/or intensity of the light signal. As a result, the creation of these additional electrons from a single photon increases the sensitivity of the light detector.

Although FIG. 7A illustrates the modulator 18 being present on the entire length of the loop waveguide 70, the modulator 18 can be present on only a portion of the loop waveguide 70. In either case, the modulator 18 can be constructed according to FIG. 6A. Alternately, the loop waveguide 70 can exclude a modulation region 16 and accordingly a modulator 18. For instance, FIG. 7A through FIG. 7G can illustrate the construction of the secondary loop waveguide 24 and secondary light detector 25 and/or tertiary loop waveguide 32 and/or tertiary light detector 34 of FIG. 2A through FIG. 4B.

Additional details about the operation and/or construction of a light detector 22 constructed according to FIG. 7G can be found in U.S. patent application Ser. No. 12/589,501, filed on Oct. 23, 2009, entitled "System Having Light detector with Enhanced Sensitivity," and incorporated herein in its entirety. Additional light detector constructions that are suitable with the light detector 22 of FIG. 7A through FIG. 7G are disclosed in U.S. patent application Ser. No. 12/380,016, filed on Feb. 19, 2009, entitled "Optical Device Having Light detector Employing Horizontal Electrical Field," and incorporated herein in its entirety, and also in U.S. patent application Ser. No. 12/584,476, filed on Sep. 4, 2009, entitled "Optical Device Having Light detector Employing Horizontal Electrical Field," and incorporated herein in its entirety, and also in U.S. patent application Ser. No. 12/799,633, filed on Apr. 28, 2010, entitled "Optical Device Having Partially Butt-Coupled Light Sensor," and incorporated herein in its entirety, and also in U.S. patent application Ser. No. 12/803, 136, filed on Jun. 18, 2010, entitled "System Having Light Sensor with Enhanced Sensitivity," and incorporated herein in its entirety, and also in U.S. patent application Ser. No. 12/804,769, filed on Jul. 28, 2010, entitled "Light Monitor Configured to Tap Portion of Light Signal from Mid-Waveguide," and incorporated herein in its entirety,.

The modulators 18 and the light detectors 22 disclosed in FIG. 6A through FIG. 7G and U.S. patent application Ser. Nos. 11/146,898, 12/380,016, 12/584,476, 12/589,501, 12/228,671, 12/799,633, 12/803,136, and 12/804,769 can each serve as one or more of the modulators 18 and/or light detectors 22, 25, 34 disclosed in FIGS. 1A through FIG. 8B or can be combined to serve as the modulators 18 and/or light detectors 22, 25, 34 disclosed in FIGS. 1A through FIG. 8B.

Figure 8A:
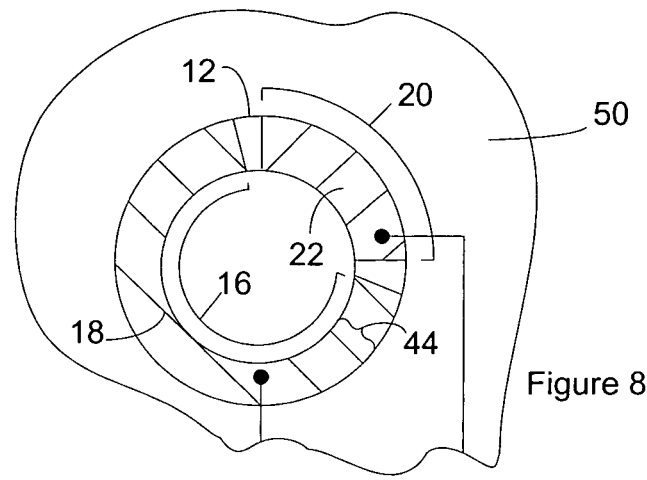
FIG. 8A and FIG. 8B illustrate loop waveguides having both a modulation region and a sensing region.
Figure 8B:
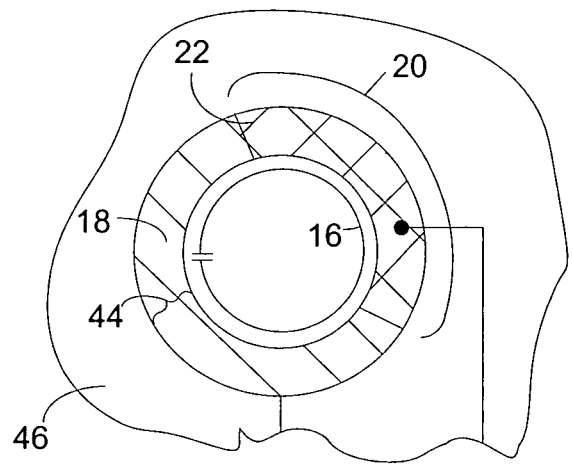

As is evident from the discussion of FIG. 1A through FIG. 1B, a single loop waveguide 12 can include both a modulation region 16 and a sensing region 20. FIG. 8A through FIG. 8B illustrate loop waveguides 12 having both a modulation region 16 and a sensing region 20. The modulation region 16 and sensing region 20 can be positioned on different lengths of the loop waveguide 12 without overlapping one another as shown in FIG. 8A. Alternately, the modulation region 16 and sensing region 20 can overlap on the loop waveguide 12 as shown in FIG. 8B. Although FIG. 8B illustrates the modulation region 16 and sensing region 20 overlapping on only a portion of the loop waveguide 12, the modulation region 16 and sensing region 20 can overlap on the entire length of the loop waveguide 12.

Suitable electronics 26 for executing the above operations can include a controller. A suitable controller includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics 26. A general-purpose processor may be a microprocessor, but in the alternative, the controller may include or consist of any conventional processor, microcontroller, or state machine. A controller may also be implemented as a combination of computing devices, e.g., a combination of a DSP and a microprocessor, a plurality of microprocessors, one or more microprocessors in conjunction with a DSP core, or any other such configuration.

The electronics 26 can optionally include a memory in communication with the controller. The electronics 26 can store data for executing the functions of the electronics 26 in the memory. The memory can be any memory device or combination of memory devices suitable for read and/or write operations.

In some instances, the electronics 26 include a computer-readable medium in communication with the controller. The computer-readable medium can have a set of instructions to be executed by the controller. The controller can read and execute instructions included on the computer-readable medium. The controller executes the instructions such that the electronics 26 perform one or more of the described functions. The computer-readable medium cab be different from the memory or can be the same as the memory. Suitable computer-readable media include, but are not limited to, optical discs such as CDs, magnetic storage diskettes, Zip disks, magnetic tapes, RAMs, and ROMs. Some functions of the electronics 26 may be executed using hardware as opposed to executing these functions in firmware and/or software.

Although the input waveguide 10 is disclosed as carrying input light signals, the above devices can be operated in reverse. For instance, the output waveguide 14 can carry the input to the device and the input waveguide 10 can carry the output from the device.

The above disclosure discusses the electronics tuning of the device so the device is operating at the maximum or minimum of some variable. However, common feedback tuning techniques can be employed to achieve this tuning. For instance, changes to the output of the light detector in response to tuning of the modulator and/or wavelength tuner may not be efficient. As a result, it may be more useful to use the derivative of the variable for tuning. A useful derivative would be the rate of change in the output of the light detector. As a result, the tuning can be achieved by making a change to the modulator and/or wavelength tuner, measuring the derivative of the variable and then making another change to the modulator and/or wavelength tuner in response to the derivative.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:
1. An optical device, comprising:
waveguides configured to guide light signals, the waveguides including an input waveguide and one or more loop waveguides,
one of the loop waveguides being a primary loop waveguide that is optically coupled with the input waveguide at a coupled wavelength of light, the optical coupling being such that light guided in the input waveguide and having the coupled wavelength is coupled into the primary loop waveguide,
a tuner configured to tune the wavelength at which the light is optically coupled from the input waveguide into the primary loop waveguide;
one or more light detectors that each provides an output indicating an intensity of light guided on one of the one or more loop waveguides, one of the one or more light detectors is a first light detector configured to provide an output indicating the intensity of the light guided on a second one of the loop wavegides, the second loop waveguide being different from the primary loop waveguide; and electronics that tune the tuner in response to the output from the first light detector.

2. The device of claim 1, wherein a second one of the one or more light detectors is configured to provide an output indicating the intensity of the light on the primary loop waveguide.

3. The device of claim 1, wherein the second loop waveguide is optically coupled to the input waveguide but is not optically coupled to any other waveguides.

4. The device of claim 1, wherein one of the one or more light detectors is a second light detector configured to provide an output indicating the intensity of the light guided on a third one of the loop waveguides, the third loop waveguide being different from the primary loop waveguide.

5. The device of claim 4, wherein the third loop waveguide and the second loop waveguide are each optically coupled to the input waveguide.

6. The device of claim 5, wherein the third loop waveguide and the second loop waveguide are each not optically coupled to any waveguides other than the input waveguide.

7. The device of claim 1, wherein one of the one or more loop waveguides is optically coupled to an output waveguide and the first light detector is positioned to receive light after the light has been coupled from the input waveguide into the primary loop waveguide but before the light is coupled from the one or more loop waveguides into the output waveguide.

8. The device of claim 7, wherein the first detector is integrated into one of the one or more loop waveguides.

9. The device of claim 8, wherein a second one of the one or more light detectors is integrated into the primary loop waveguide.

10. The device of claim 1, wherein the second loop waveguide is optically coupled to the input waveguide but is not optically coupled to any other waveguides.

11. The device of claim 7, wherein the primary loop waveguide is optically coupled to both the input waveguide and the output waveguide.

12. The device of claim 11, wherein one of the one or more light detectors is a second light detector configured to provide an output indicating the intensity of the light guided on a third one of the loop wavegides, the third loop waveguide being different from the primary loop waveguide.

13. The device of claim 12, wherein the third loop waveguide is optically coupled to the output waveguide.

14. The device of claim 12, wherein the third loop waveguide is optically coupled to the input waveguide.

15. The device of claim 1, wherein the electronics tune the tuner so as to maximize the intensity of light indicated by the first light sensor.

16. The device of claim 1, wherein the electronics tune the tuner so as to minimize the intensity of light indicated by the first light sensor.

17. The device of claim 1, wherein the second loop waveguide is a ridge waveguide and a ridge of the ridge waveguide includes the second light detector.

* * * * *